United States Patent
Pritchard et al.

(10) Patent No.: US 10,529,008 B1
(45) Date of Patent: Jan. 7, 2020

(54) INTEGRATION OF ITEM VARIATIONS FOR DISPLAY IN USER INTERFACES

(71) Applicant: Amazon Technologies, Inc., Seattle, WA (US)

(72) Inventors: Allana Pritchard, Seattle, WA (US); David Robert Cole, Brier, WA (US); Alison Louise Cramer, Seattle, WA (US); Kevin Frank Hadder, Seattle, WA (US); Nasarullah Ahsanullah Khan, Bangalore (IN); Maria Joseph Daniel Victor, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 471 days.

(21) Appl. No.: 15/405,852

(22) Filed: Jan. 13, 2017

(51) Int. Cl.
*G06Q 30/02* (2012.01)
*G06Q 30/06* (2012.01)
*G06F 3/0482* (2013.01)
*G06F 3/0488* (2013.01)

(52) U.S. Cl.
CPC ....... *G06Q 30/0641* (2013.01); *G06F 3/0482* (2013.01); *G06F 3/04883* (2013.01); *G06Q 30/0222* (2013.01); *G06Q 30/0239* (2013.01); *G06Q 30/0629* (2013.01)

(58) Field of Classification Search
CPC .................................................... G06Q 30/02
See application file for complete search history.

(56) References Cited

U.S. PATENT DOCUMENTS

| | | | |
|---|---|---|---|
| 2013/0066740 A1* | 3/2013 | Ouimet | G06Q 30/06 705/26.7 |
| 2013/0110671 A1* | 5/2013 | Gray | G06Q 30/06 705/26.8 |
| 2013/0254215 A1* | 9/2013 | Davar | H04L 65/403 707/748 |
| 2014/0180876 A1* | 6/2014 | Westphal | G06Q 30/0625 705/26.62 |
| 2014/0201024 A1* | 7/2014 | Collier | G06Q 30/0621 705/26.5 |
| 2014/0223361 A1* | 8/2014 | Huang | G06F 3/0481 715/808 |
| 2015/0242374 A1* | 8/2015 | Kong | G06F 17/212 715/201 |

(Continued)

*Primary Examiner* — Vincent M Cao
(74) *Attorney, Agent, or Firm* — Lee & Hayes, P.C.

(57) ABSTRACT

Techniques for generating and presenting user interfaces that provide a consolidated representation for same or similar products available for acquisition with variations of product attributes is described. A primary user interface (UI) for presenting a product having a product attribute may be presented via a device. The primary UI may present a representation of the product with an indication that alternate product(s) are available with alternate product attributes. Based on receiving a request to access information about the alternate product(s), a secondary UI may be generated for presenting the information about the alternate product(s). The secondary UI, which may overlay a portion of the primary UI, may be presented via the device. Based on receiving an indication of a selection of an alternate product, the presentation of the secondary UI may be terminated and the primary UI may be updated to reflect the selection of the alternate product.

20 Claims, 9 Drawing Sheets

(56) References Cited

U.S. PATENT DOCUMENTS

| | | | |
|---|---|---|---|
| 2015/0242932 A1* | 8/2015 | Beguin | G06Q 30/0633 705/26.8 |
| 2017/0168996 A1* | 6/2017 | Dou | G06F 17/212 |

* cited by examiner

200

```
┌─────────────────────────────────────────────────────────────────────────┐
│ RECEIVE, FROM A DEVICE ASSOCIATED WITH A USER, A REQUEST FOR DATA       │
│ ASSOCIATED WITH OFFERS CORRESPONDING TO A PLURALITY OF PRODUCTS         │
│ AVAILABLE FOR ACQUISITION VIA A SERVICE PROVIDER 202                    │
└─────────────────────────────────────────────────────────────────────────┘
                                    │
                                    ▼
┌─────────────────────────────────────────────────────────────────────────┐
│ ACCESS, FROM A DATA STORE ASSOCIATED WITH THE SERVICE PROVIDER, THE     │
│ DATA ASSOCIATED WITH THE OFFERS, THE DATA INCLUDING TERMS OF THE        │
│ OFFERS, PRODUCT ATTRIBUTES ASSOCIATED WITH THE PLURALITY OF PRODUCTS    │
│ CORRESPONDING TO THE OFFERS, AND/OR REPRESENTATIVE ITEMS ASSOCIATED     │
│ WITH THE PLURALITY OF PRODUCTS, PRODUCT ATTRIBUTES, AND/OR TERMS OF     │
│ THE OFFERS 204                                                          │
└─────────────────────────────────────────────────────────────────────────┘
                                    │
                                    ▼
┌─────────────────────────────────────────────────────────────────────────┐
│           SEND THE DATA ASSOCIATED WITH THE OFFERS TO THE DEVICE 206    │
└─────────────────────────────────────────────────────────────────────────┘
```

```
┌─────────────────────────────────────────────────────────────────────────┐
│ RECEIVE DATA ASSOCIATED WITH OFFERS CORRESPONDING TO A PLURALITY OF     │
│ PRODUCTS THAT ARE AVAILABLE FOR ACQUISITION VIA AN ONLINE MARKETPLACE 302│
└─────────────────────────────────────────────────────────────────────────┘
                                   ↓
┌─────────────────────────────────────────────────────────────────────────┐
│ AGGREGATE PRODUCT ATTRIBUTES ASSOCIATED WITH THE OFFERS TO GENERATE     │
│                  AGGREGATED PRODUCT ATTRIBUTES 304                      │
└─────────────────────────────────────────────────────────────────────────┘
                                   ↓
┌─────────────────────────────────────────────────────────────────────────┐
│ DETERMINE A REPRESENTATIVE OFFER OF THE OFFERS, THE REPRESENTATIVE OFFER│
│   BEING ASSOCIATED WITH A FIRST PRODUCT HAVING A PRODUCT ATTRIBUTE 306  │
└─────────────────────────────────────────────────────────────────────────┘
                                   ↓
┌─────────────────────────────────────────────────────────────────────────┐
│ DETERMINE, BASED AT LEAST IN PART ON THE AGGREGATED PRODUCT ATTRIBUTES, │
│ THAT SECOND PRODUCTS WITH ALTERNATE PRODUCT ATTRIBUTES ARE AVAILABLE 308│
└─────────────────────────────────────────────────────────────────────────┘
                                   ↓
┌─────────────────────────────────────────────────────────────────────────┐
│  GENERATE A PRIMARY USER INTERFACE TO PRESENT THE REPRESENTATIVE OFFER 310│
└─────────────────────────────────────────────────────────────────────────┘
                                   ↓
┌─────────────────────────────────────────────────────────────────────────┐
│              PRESENT THE PRIMARY USER INTERFACE VIA A DISPLAY 312       │
└─────────────────────────────────────────────────────────────────────────┘
                                   ↓
┌─────────────────────────────────────────────────────────────────────────┐
│ DETERMINE A REQUEST FOR INFORMATION ASSOCIATED WITH SECOND PRODUCT(S)   │
│              HAVING ALTERNATIVE PRODUCT ATTRIBUTES 314                  │
└─────────────────────────────────────────────────────────────────────────┘
                                   ↓
┌─────────────────────────────────────────────────────────────────────────┐
│ GENERATE A SECONDARY USER INTERFACE, THE SECONDARY USER INTERFACE       │
│ INCLUDING ONE OR MORE SWATCHES ASSOCIATED WITH THE SECOND PRODUCT(S) 316│
└─────────────────────────────────────────────────────────────────────────┘
                                   ↓
┌─────────────────────────────────────────────────────────────────────────┐
│ PRESENT THE SECONDARY USER INTERFACE VIA THE DISPLAY, THE SECONDARY USER│
│ INTERFACE OVERLAYING AT LEAST A PORTION OF THE PRIMARY USER INTERFACE 318│
└─────────────────────────────────────────────────────────────────────────┘
                                   ↓
┌─────────────────────────────────────────────────────────────────────────┐
│ CAUSE AN EFFECT TO BE APPLIED TO THE PRIMARY USER INTERFACE TO DEEMPHASIZE│
│   THE PRIMARY USER INTERFACE WHILE THE SECONDARY USER INTERFACE IS      │
│                           PRESENTED 320                                 │
└─────────────────────────────────────────────────────────────────────────┘
                                   ↓
┌─────────────────────────────────────────────────────────────────────────┐
│ DETERMINE A SELECTION OF A SWATCH OF THE SWATCHES ASSOCIATED WITH A     │
│     SECOND PRODUCT HAVING AN ALTERNATE PRODUCT ATTRIBUTE 322            │
└─────────────────────────────────────────────────────────────────────────┘
                                   ↓
┌─────────────────────────────────────────────────────────────────────────┐
│ UPDATE THE PRIMARY USER INTERFACE TO REFLECT THE SECOND PRODUCT HAVING  │
│              THE ALTERNATE PRODUCT ATTRIBUTE 324                        │
└─────────────────────────────────────────────────────────────────────────┘
```

DETERMINE THAT A USER IS FINISHED INTERACTING WITH A SECONDARY USER INTERFACE OVERLAYING AT LEAST A PORTION OF A PRIMARY USER INTERFACE, THE PRIMARY USER INTERFACE SUBJECT TO AT LEAST ONE EFFECT TO DEEMPHASIZE THE PRIMARY USER INTERFACE 502

TERMINATE THE PRESENTATION OF THE SECONDARY USER INTERFACE 504

REMOVE THE EFFECT ASSOCIATED WITH THE PRIMARY USER INTERFACE 506

FIG. 5

INTEGRATION OF ITEM VARIATIONS FOR DISPLAY IN USER INTERFACES

BACKGROUND

Online marketplaces offer various products for acquisition on behalf of sellers (e.g., merchants and/or service providers). Different sellers may offer the same or substantially similar products; however, the products may vary in various product attributes. For instance, a first seller may offer Brand X boots in a size 5 and a second seller may offer a same type of Brand X boots in a size 8. Or, the first seller may offer Brand X boots in a first color and a second seller may offer a same type of Brand X boots in a second color. Accordingly, different variations of products may be available with different combinations of product attributes.

Customers may browse an inventory of products that are available for acquisition using various devices, such as mobile phones, tablet computers, laptop computers, etc. Presenting the different variations of products and/or different combinations of product attributes poses a particular challenge, especially in mobile environments. Generally, mobile devices have a smaller display than other devices. Accordingly, to enable customers to browse the different variations of products and/or different combinations of product attributes, current techniques require customers to navigate away from a product page to browse the different variations of products and/or different combinations of product attributes. In some examples, a customer is required to visit two or more peripheral pages to select different product attributes. That is, in some examples, a customer is required to navigate away from a product page associated with a product multiple times (often returning to the product page between navigations away from the product page) to select a product with each of the product attributes desired by the customer.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2 is a flow diagram showing an illustrative process to access data associated with offers corresponding to a plurality of products that are available for acquisition and sending the data to a remote device.

FIG. 3 is a flow diagram showing an illustrative process to generate a primary user interface and a secondary user interface and present the secondary user interface at least partially overlaying the primary user interface to provide a consolidated representation for same or similar products that are available for acquisition with variations of one or more product attributes.

FIG. 5 is a flow diagram showing an illustrative process to restore a primary user interface to an original presentation.

DETAILED DESCRIPTION

Figure 1:
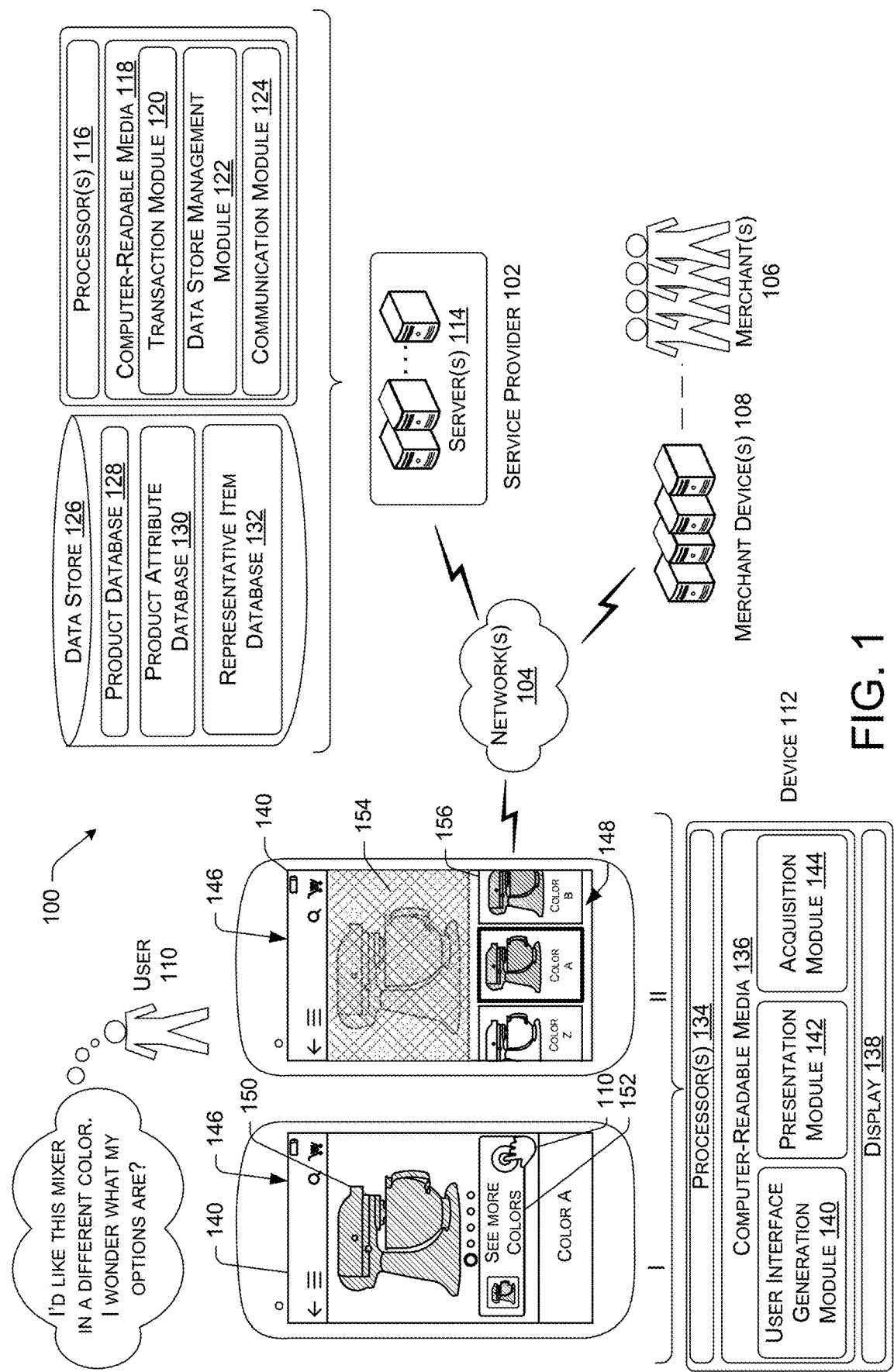
FIG. 1 is a diagram showing an example system for generating and providing user interfaces that provide a consolidated representation for same or similar products that are available for acquisition with variations of one or more product attributes.

This disclosure describes techniques for generating and presenting user interfaces that provide a consolidated representation for same or similar products that are available for acquisition with variations of one or more product attributes. As described above, online marketplaces offer various products for acquisition on behalf of sellers (e.g., merchants and/or service providers). Different sellers may offer the same or substantially similar products; however, the products may vary in various product attributes. Accordingly, different variations of products may be available with different combinations of product attributes. Navigating the different variations of products and the different combinations of product attributes has added an increased complexity to browsing inventory that is available via online marketplaces. In at least one example, techniques described herein help customers navigate the increased complexity of browsing inventory available in online marketplaces, particularly in mobile environments where displays are smaller than displays associated with other devices (e.g., tablet computers, laptop computers, etc.). However, it should be noted that while this disclosure describes techniques for helping customers navigate the increased complexity of browsing inventory available via online marketplaces in mobile environments, techniques described herein may be applicable to any environment enabling customers to browse inventory available via online marketplaces.

Techniques described herein are directed to generating user interfaces that can display products associated with various product attributes within a primary experience, such as a product page associated with a product. That is, techniques described herein enable customers to stay anchored in a primary experience and have the optionality to make selections of various product attributes while in the primary experience. For the purpose of this discussion, products may include goods, services, etc. Product attributes may describe aspects of a product. Product attributes may include, but are not limited to, dimensions, colors, sizes, design specifications, flavors, etc. As a non-limiting example, product attributes associated with a mixer may include colors, bowl sizes (e.g., 3.5-Quart, 5-Quart, 6-Quart), types of the mixer (e.g., lift-stand or tilt-head), etc. As another non-limiting example, product attributes associated with a tablet computer may include amounts of storage, type of processors, weights, sizes of a display, etc. Or, as yet another non-limiting example, product attributes associated with a bag of coffee may include sizes of the bag (e.g., number of ounces), roasts (e.g., bold, light, etc.), states of the coffee (e.g., beans, grounds, etc.), etc.

In at least one example, techniques described herein are directed to generating a secondary user interface that overlays at least a portion of a primary user interface. A primary user interface may correspond to a product page. The product page may present a representative item (e.g., textual, graphical, etc.) associated with a product, details associated with an offer to acquire the product (e.g., price, shipping information, delivery options, etc.), and product attributes associated with the product. In some examples, the product page may include an indication that alternate products having alternate product attributes are available. To enable a customer to browse the alternate products, the secondary user interface may overlay at least a portion of the product page. In some examples, the product page may be deemphasized (e.g., an opaque layer may be positioned on top of the product page, etc.) while the secondary user interface is presented to visually indicate that the primary user interface is not active.

In at least one example, the secondary user interface may include swatches representative of variations of product attributes. For instance, a swatch may be associated with an offer for a product having a particular product attribute. Each swatch may be associated with a variation of a product attribute. For instance, a first swatch may be associated with an offer for a product in a size large and a second swatch may be associated with an offer for a same type of product in a size small.

Each swatch may present a representative item of a product associated with an offer represented by the swatch and may include information associated with the terms of the offer. Based at least in part on a customer interacting with a swatch to select the associated product, aspects of the product page may change to reflect the customer's selection. Accordingly, customers may see the effects of their selections on the product and/or other variable aspects (e.g., other product attributes, offer terms, etc.) without leaving the product page. Upon making a determination that the customer is no longer browsing the secondary user interface, the secondary user interface may be retracted and the product page may be restored to its original presentation. The product page may reflect the offer associated with the product having the alternate product attribute(s) in its original presentation.

As a non-limiting example, a customer may be interested in a sweater. The product page associated with a first sweater may depict a red sweater. Additional information presented via the product page may indicate that the red sweater is available in a size medium, from Seller A, for $39.95. The product page may indicate that there are additional sweaters available that are like the first sweater (i.e., a same type of product), but with different product attributes. For instance, the additional sweaters may have different sizes or colors. The customer may indicate that he or she is interested in browsing the additional sweaters. A secondary user interface may be presented, as described above. That is, a secondary user interface may overlay at least a portion of the product page. As described above, in some examples, the product page may be deemphasized via various techniques. The customer may browse the additional sweaters by browsing swatches that are representative of the additional sweaters. In an example, the customer may select a swatch representative of a blue sweater. The blue sweater may be a same type of sweater as the first (red) sweater. As a result, the depiction of the red sweater on the product page may be updated to a blue sweater. Based at least in part on determining that the customer is done browsing the additional sweaters, the secondary user interface may be retracted. When the secondary user interface is retracted, the product page may be reemphasized (i.e., restored to its original presentation). When the product page is restored to its original presentation, the contents of the product page may reflect an offer associated with the blue sweater. That is, the product page may now depict the blue sweater and may indicate that the blue sweater is available in a size medium, from Seller M, for $45.95.

Techniques described herein enable customers to browse different variations of products and the different combinations of product attributes without leaving a primary experience (i.e., the product page). Accordingly, techniques described herein are less cumbersome for customers, especially in mobile environments. That is, techniques described herein enable customers to browse (and select) variations of multiple product attributes without navigating away from a primary product page. Furthermore, techniques described herein conserve computational resources by reducing the number of peripheral pages that are generated and presented to customers to enable customers to browse different variations of products and different combinations of product attributes.

FIG. 1 is a diagram showing an example system 100 for generating and presenting user interfaces that provide a consolidated representation for same or similar products that are available for acquisition with variations of one or more product attributes. More particularly, the system 100 may include a service provider 102, one or more network(s) 104, one or more merchants 106, one or more merchant devices 108 respectively corresponding to the one or more merchants 106, a user 110, and a device 112 corresponding to the user 110. In some examples, the user 110 may operate a device 112 to perform various functions associated with the device 112, which may include at least some of the operations and/or modules discussed below with respect to the service provider 102.

The service provider 102 may be any entity, server(s), platform, etc., that provides products (e.g., goods, services, etc.) to user(s) (e.g., user 110) on behalf of itself, merchant(s) 106, and/or other service providers. That is, in at least one example, the service provider 102 may be associated with an online marketplace. The service provider 102 may be implemented in a non-distributed computing environment or may be implemented in a distributed computing environment, possibly by running some modules on remotely located devices (e.g., merchant device(s) 108, device 112, etc.).

As shown, the service provider 102 may include one or more server(s) 114, which may include one or more processor(s) 116 and computer-readable media 118. The server(s) 114 may also include additional components not listed above that may perform any function associated with the server(s) 114. In various embodiments, each of the server(s) 114 may be any type of server, such as a network-accessible server. In various examples, the processor(s) 116 may execute one or more modules and/or processes to cause the server(s) 114 to perform a variety of functions, as set forth above and explained in further detail in the following disclosure. In some embodiments, the processor(s) 116 may include a central processing unit (CPU), a graphics processing unit (GPU), both a CPU and a GPU, or other processing units or components known in the art. Additionally, each of the processor(s) 116 may possess its own local memory, which also may store program modules, program data, and/or one or more operating systems.

In at least one configuration, the computer-readable media 118 of the server(s) 114 may include one or more modules and data structures including, for example, a transaction module 120, a data store management module 122, and a communication module 124. The one or more modules and data structures may be in the form of stand-alone applications, productivity applications, an operating system component, or any other application or software module having features that facilitate interactions between the merchant device(s) 108, device 112, and/or the service provider 102. Depending on the exact configuration and type of the server(s) 114, the computer-readable media 118 may also include volatile memory (such as RAM), non-volatile memory (such as ROM, flash memory, miniature hard drive, memory card, or the like), or some combination thereof.

The transaction module 120 may be configured to facilitate transactions between user(s) (e.g., user 110), merchant(s) 106, and/or the service provider 102. In at least one example, the transaction module 120 may receive an indication that a user (e.g., user 110) desires to acquire a product offered for acquisition by the service provider 102. In some examples, the indication may include data associated with the user (e.g., banking information, etc.). The transaction module 120 may facilitate the transaction and provide an indication to the device 112 associated with the user 110 signaling whether the transaction was successful or not successful, or whether additional information is needed to complete the transaction. In some examples, based at least in part on determining that the transaction is approved, the transaction module 120 may facilitate delivery of the product to the user 110. In other examples, based at least in part on determining that the transaction is approved, the transaction module 120 may communicate with merchant device(s) 108 to facilitate delivery of the product to the user 110.

The data store management module 122 may be in communication with the merchant device(s) 108 and/or additional and/or alternative service providers to receive data for storing in a data store 126 and/or updating data stored in the data store 126. As described below, the data may include data associated with products and offers for acquiring the products, data associated with product attributes of the products, and/or representative item(s) associated with the products and/or offers. In at least one example, the data store management module 122 may receive and send data in near real-time. In some examples, the data store management module 122 may receive data in various forms (e.g., associated with different fields, different names, etc.) and may pre-process the data prior to providing the data to the data store 126.

The communication module 124 may be configured to provide data to remotely located device(s) (e.g., device 112) to facilitate generating primary user interfaces and secondary user interfaces. That is, in at least one example, the communication module 124 may receive a request from a remote device (e.g., device 112) for data that is to be presented via a primary user interface or secondary user interface. The communication module 124 may access corresponding data from the data store 126, described below, and may send the data to the remote device (e.g., device 112).

In at least one example, the one or more server(s) 114 may be associated with a data store 126. The data store 126 may be configured to store data that is accessible, manageable, and updatable. In some examples, the data store 126 may be associated with a separate device and may be communicatively coupled to the processor(s) 116 and computer-readable media 118. In other examples, the data store 126 may be integrated in a same device as the processor(s) 116 and computer-readable media 118. The data store 126 may include a product database 128, a product attribute database 130, and a representative item database 132.

The product database 128 may store data associated with products that are available for acquisition via the service provider 102. That is, the product database 128 may be a comprehensive catalog of products that are available for acquisition via the service provider 102. In at least one example, as described herein, the products may be associated with different merchants, vendors, service providers, etc. In some examples, the data store management module 122 may be in communication with the merchant device(s) 108 and/or additional and/or alternative service providers to receive data associated with the products. In at least one example, the data store management module 122 may receive new data to update existing data associated with a product in the product database 128. For instance, existing data associated with a product in the product database 128 may indicate that there are five products available from a particular merchant 106. However, the particular merchant 106 may sell one of the products and accordingly may only have four products available. A merchant device 108 may send data to the data store management module 122 indicating an update to the number of products that are available (e.g., from five to four). The data store management module 122 may update data in the product database 128 to reflect the updated number of products that are available. In additional and/or alternative examples, the data store management module 122 may receive new data associated with a new product to add to the product database 128.

In at least one example, each product, for which data is stored in the product database 128, may be associated with an offer. An offer may be associated with terms for acquiring a product associated with the offer. Non-limiting examples of terms of an offer may include a seller (e.g., merchant or service provider) offering the product for acquisition, a price, product attributes (e.g., dimensions, weight, materials, colors, etc.), a quantity available, shipping terms, payment terms, delivery options, etc. In at least one example, data associated with an offer for a product may be mapped to, or otherwise associated with, the data associated with the product in the product database 128. In at least one example, the data store management module 122 may receive new data to update existing data associated with offers in the product database 128.

The product attribute database 130 may store data associated with product attributes of individual products that are available for acquisition via the service provider 102. As described above, product attributes may include, but are not limited to, dimensions of a product, colors of a product, sizes of a product, amounts of storage available for a product, flavors of a product, etc. In at least one example, data associated with product attributes of a product may be mapped to, or otherwise associated with, data associated with the product in the product database 128. In at least one example, the data store management module 122 may receive new data to update existing data associated with product attributes in the product attribute database 130 and/or add new data associated with product attributes to the product attribute database 130.

The representative item database 132 may store representations of products, product attributes, and/or offer terms. In at least one example, a product, a product attribute, and/or a term of an offer may be associated with a representative item. A representative item may be a textual representation or a graphical representation (e.g., graphic, image, etc.). As a non-limiting example, a size of a ring may be a product attribute associated with the ring. A textual representation of a particular size of a ring (e.g., size five, size six, etc.) may be stored in the representative item database 132. Or, as another non-limiting example, a color of a mixer may be a product attribute associated with the mixer. A graphical representation, such as an image, of a particular color of the mixer may be stored in the representative item database 132. In at least one example, representative items may be mapped to, or otherwise associated with, data associated with respective products, product attributes, or offer terms in the product attribute database 130 or product database 128, respectively. In at least one example, the data store management module 122 may receive new representative item(s) to update existing representative item(s) in the representative item database 132 and/or add new representative items(s) to the representative item database 132.

In various examples, the service provider 102 may present products to a user 110 on behalf of itself, merchants, other service provider(s), etc. via user interfaces, as described herein. The products may include goods, services, combinations of goods and services, etc. The network(s) 104 may facilitate communication between merchant device(s) 108, device 112, and/or server(s) 114. In some examples, the network(s) 104 may be any type of network known in the art, such as the Internet. Moreover, the merchant device(s) 108, device 112, and/or server(s) 114 may communicatively couple to the network(s) 104 in any manner, such as by a wired or wireless connection.

In at least one example, merchant(s) 106 may interact with the service provider 102 via the network(s) 104 to offer products for acquisition by user(s) (e.g., user 110). In various examples, the merchant(s) 106 may be any individual or entity that is a source or a distributor of products that may be acquired or used by the user 110. For example, the merchant(s) 106 may include entities that provide products to user(s), which may be offered or promoted directly by the merchant(s) 106 or by the service provider 102. The merchant(s) 106 may also offer items via a physical location (e.g., a brick-and-mortar store, etc.), a merchant-branded merchant site (e.g., website), an intermediary marketplace, etc.

The merchant(s) 106 may interact with the service provider 102 via merchant device(s) 108. The merchant device(s) 108 may facilitate transactions between the merchant(s) 106, user(s) (e.g., user 110), and/or service provider 102. The merchant device(s) 108 may be any computing device capable of communicating over the network(s) 104. Non-limiting examples of a merchant device 108 may include a tablet computing device, a smart phone or mobile communication device, a laptop, a netbook or other portable computer or semi-portable computer, a desktop computing device, a terminal computing device or other semi-stationary or stationary computing device, a wearable computing device or other body-mounted computing device, etc. The merchant device(s) 108 may enable respective merchant(s) 106 to offer products for acquisition to the service provider 102. In some examples, the service provider 102 may acquire products from the merchant(s) 106 and sell the products on behalf of itself (i.e., the service provider 102). In other examples, the service provider 102 may offer products for acquisition on behalf of the merchant(s) 106. In such examples, the service provider 102 may facilitate transactions on behalf of the merchant(s) 106, but may not have possession of the products themselves.

In at least one example, merchant(s) 106 may provide offers to the service provider 102 via corresponding merchant device(s) 108. An offer may identify a product that is available for acquisition and terms of the offer, as described above. For instance, the terms of an offer may identify a price, product attributes (e.g., dimensions, weight, materials, colors, etc.), a quantity available, shipping terms, payment terms, delivery options, etc. Based at least in part on receiving, from the service provider 102, an indication that a user 110 or the service provider 102 agrees to acquire the product corresponding to the offer per the terms of the offer, a merchant device 108 associated with a merchant 106 associated with the offer may facilitate providing the product (or a means to access the product) to the user 106 or the service provider 102.

In addition to providing offers to the service provider 102, a merchant device 108 may provide real time updates to the service provider 102 regarding the status of a corresponding merchant's inventory (i.e., products associated with the merchant that are available for acquisition). That is, the merchant device 108 may send updates to the service provider 102 when the merchant 106 sells a product or adds a new product to its inventory. Moreover, a merchant device 108 may provide real time updates to the service provider 102 regarding product attributes and/or representative items of products, product attributes, and/or offers.

The user 110 may interact, via a corresponding device 112, with the service provider 102 via a site (i.e., a website), a self-service merchant portal, a self-service interface, or in any other manner. Device 112 may be any computing device that is capable of communicating over the network(s) 104. Non-limiting examples of device 112 may include a tablet computing device, a smart phone or mobile communication device, a laptop, a netbook or other portable computer or semi-portable computer, a desktop computing device, a terminal computing device or other semi-stationary or stationary computing device, a wearable computing device or other body-mounted computing device, etc.

As shown, the device 112 may include one or more processor(s) 134, computer-readable media 136, and a display 138. The device 112 may also include additional components not listed above that may perform any function associated with the device 112. In various examples, the processor(s) 134 may execute one or more modules and/or processes to cause the device 112 to perform a variety of functions, as set forth above and explained in further detail in the following disclosure. In some embodiments, the processor(s) 134 may include a CPU, GPU, both a CPU and a GPU, or other processing units or components known in the art. Additionally, each of the processor(s) 134 may possess its own local memory, which also may store program modules, program data, and/or one or more operating systems.

In at least one configuration, the computer-readable media 136 may include one or more modules and data structures including, for example, a user interface generation module 140, a presentation module 142, and an acquisition module 144. The one or more modules and data structures may be in the form of stand-alone applications, productivity applications, an operating system component, or any other application or software module having features that facilitate interactions between the merchant device(s) 108, device 112, and/or the service provider 102. Depending on the exact configuration and type of the device 112, the computer-readable media 136 may also include volatile memory (such as RAM), non-volatile memory (such as ROM, flash memory, miniature hard drive, memory card, or the like), or some combination thereof.

The user interface generation module 140 may be configured to generate user interfaces that provide a consolidated representation for same or similar products that are available for acquisition with variations of one or more product attributes. In at least one example, the user interface generation module 102 may receive data from the server(s) 114, described above, and may utilize the data to generate primary user interfaces and secondary user interfaces. In some examples, the user interface generation module 140 may receive text and/or graphics to be organized in user interface(s) using various technologies (e.g., hypertext transfer, other protocols, etc.). Additional details associated with generating primary user interfaces and secondary user interfaces are described below with reference to FIGS. 2-4. It should be noted that while generating the primary user interface and the secondary user interface is described as happening on device 112, in additional and/or alternative examples, at least some of the primary user interface and/or secondary user interface generation may be performed on the server(s) 114 and instructions for presenting the primary user interface and/or secondary user interface may be provided to the device 112. Various examples of user interfaces that show consolidated representations for products that are available for acquisition with variations of one or more product attributes are described below with reference to FIGS. 6A-D, 7, 8A, and 8B.

The presentation module 142 may receive instructions for presenting user interface(s) via the display 138 and may process the instructions for presenting the user interface(s) via the display 138. In at least one example, a user 110 may browse an inventory of products available for acquisition via the service provider 102 by interacting with one or more user interfaces. Example I of device 112 represents a primary user interface 146. Example II of device 112 represents the primary user interface 146 with a secondary user interface 148 overlaying at least a portion of the primary user interface 146. The one or more user interfaces may be presented via the display 138 of the device.

Primary user interface 146 is a non-limiting example of a user interface configured to provide a user 110 with functionality to view an offer associated with a product. The presentation module 142 may receive instructions for presenting primary user interface 146 and may cause primary user interface 146 to be output via the display 138 of the device 112. As a non-limiting example, primary user interface 146 is associated with a mixer. That is, primary user interface 146 is representative of an offer associated with the mixer. In some examples, the primary user interface 146 may include a representative item 148 associated with the product. Primary user interface 146 depicts a graphical representative item 150, but in alternative examples, the primary user interface 146 may depict a textual representative item. In at least one example, primary user interface 146 may include representations of terms of the offer (e.g., a seller, a price, product attributes (e.g., dimensions, weight, materials, colors, etc.), a quantity available, shipping terms, payment terms, delivery options, etc.). Additionally, in at least one example, primary user interface 146 may include an indication that alternate product(s) that are a same type of product as the product, having different product attributes, are available. For instance, primary user interface 146 includes a control 152 indicating that there are other mixers associated with other colors available, and possibly other information such as a number of different colors, price information, or other information associated with the other items (e.g., other mixers).

The user 110 may indicate that he or she desires to view the alternate product(s). For instance, the user 110 may actuate the control 152 by touch input, speech input, gaze input, etc. In FIG. 1, the user 110 is touching a region of the display 138 that corresponds to the control 152 to indicate that he or she desires to view the alternate products(s). Based at least in part on determining that the user 110 desires to view the alternate product(s), the user interface generation module 140 may generate a secondary user interface 148. The user interface generation module 140 may send instructions associated with the secondary user interface to the presentation module 142, which may output the secondary user interface 148 via the display 138.

The secondary user interface 148 may overlay at least a portion of primary user interface 146. In some examples, the secondary user interface 148 may overlay a bottom portion of the primary user interface 146, as shown in FIG. 1. In other examples, the secondary user interface 148 may overlay a left portion of the primary user interface 146, a right portion of the primary user interface 146, a top portion of the primary user interface 146, a middle portion of the primary user interface 146, etc. In at least one example, based at least in part on presenting the secondary user interface 148, the presentation module 142 may cause an effect to be applied to the primary user interface 146 to deemphasize the primary user interface 146 and/or indicate that the primary user interface 146 is not active while the secondary user interface 148 is being presented. For instance, the presentation module 142 may cause a layer 154 having a degree of opaqueness to overlay the primary user interface 146, or the presentation module 142 may reduce the size or brightness of the features of the primary user interface 146. Other examples of deemphasizing the primary user interface 146 while the secondary primary user interface 146 is presented may be imagined.

The secondary user interface 148 may include swatches corresponding to individual offers associated with alternate products. Swatch 156 is an example of a swatch associated with an offer for a mixer in Color B. Additional details associated with swatches are described below. In at least one example, the offers presented via swatches may be filtered based at least in part on a product attribute of the product presented via the primary user interface 146. That is, if the product associated with the primary user interface 146 is a size 8, the swatches presented via the secondary user interface 148 may reflect a variation of a product attribute associated with other products (i.e., same type of products as the product presented via the primary user interface) in a size 8 (which may be different than the variations of the product attribute for another size). In other examples, multiple sets of swatches each corresponding to variations of multiple product attributes may be presented via a secondary user interface, as described below.

The user 110 may browse through the alternate products by scrolling, swiping, or otherwise navigating through the swatches. Based at least in part on the user 110 selecting one of the swatches, the presentation module 142 can update the primary user interface 146 to depict a representation of the product corresponding to the offer associated with the selected swatch. That is, in the non-limiting example provided in FIG. 1, the presentation module 142 may update the primary user interface 146 to depict a representative item of a mixer in Color B (not shown in FIG. 1).

Based at least in part on determining that the user 110 is done browsing alternate product(s) associated with the secondary user interface 148, the presentation module 142 may terminate the presentation of the secondary user interface 148 and restore the original presentation of the primary user interface 146. That is, the presentation module 142 may remove the layer 154 or restore the features of the primary user interface 146 back to their original size or brightness. In at least one example, when the secondary user interface 148 is retracted and the primary user interface 146 is restored to its original presentation, the primary user interface 146 may depict a representation of a different offer associated with a different product having a different product attribute than what was previously represented. That is, instead of depicting a representation of an offer for a mixer in Color A, the primary user interface 146 may now present a representation of an offer for a mixer in Color B. In such examples, various product attributes and/or terms associated with the offer may be updated to reflect the offer for the mixer in Color B. For instance, the price may have changed or the availability (e.g., in stock) may have changed.

The acquisition module 144 may enable a user 110 to acquire products offered for acquisition via the service provider 102. In at least one example, the user 110 may interact with the service provider 102 to acquire one or more products that are offered for acquisition on behalf of merchant(s) 106 and/or the service provider 102. In an example, a user 106 may interact with device 112 to indicate a desire to acquire a product. For instance, in various examples, a user 110 may acquire a product by actuating a control on a user interface presented on a display 138 of a device 112 to acquire the product. The control may be associated with a hyperlink or an overlay that directs the user 110 to a new user interface and prompts the user 110 to input information for acquiring the product (e.g., banking information, shipping information, etc.).

The acquisition module 144 may send an indication to the service provider 102 signaling that the user 110 desires to acquire a product. In some examples, the acquisition module 144 may send data associated with the information provided by the user 110 (e.g., banking information, shipping information, etc.). The service provider 102 may facilitate the transaction and may communicate a status of the transaction to the acquisition module 144. A status of a transaction may indicate whether the transaction was successful or unsuccessful, or whether additional information is needed to proceed. In response to a successful transaction, the service provider 102 may provide the product (or access to the product) to the user 110. In at least one example, based at least in part on a user 110 acquiring a product, the user 110 may receive the product via physical mail or the user 110 may pick the product up at a physical store location associated with a merchant 108 and/or service provider 102.

Display 138 may be an output device for presenting information (e.g., user interface(s)) in visual form. The display 138 may have a display size (i.e., viewport), which is the actual amount of screen space that is available to display content without obstruction from the case or other aspects of the device's 112 design. That is, displays of various devices may be associated with different sizes. For instance, a display associated with a mobile communication device may have a smaller size than a display associated with a table computing device or a laptop computing device.

FIGS. 2-5 describe example processes for generating and presenting user interfaces that provide a consolidated representation for same or similar products that are available for acquisition with variations of one or more product attributes. The example processes are described in the context of the environment of FIG. 1 but are not limited to that environment. The processes are illustrated as logical flow graphs, each operation of which represents a sequence of operations that may be implemented in hardware, software, or a combination thereof. In the context of software, the operations represent computer-executable instructions stored on one or more computer-readable media 118 or computer-readable media 136 that, when executed by one or more processor(s) 116 or processor(s) 134, perform the recited operations. Generally, computer-executable instructions include routines, programs, objects, components, data structures, and the like that perform particular functions or implement particular abstract data types.

The computer-readable media 118 or computer-readable media 136 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some embodiments the computer-readable media 118 or computer-readable media 136 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

FIG. 2 is a flow diagram showing an illustrative process 200 to access data associated with offers corresponding to a plurality of products that are available for acquisition and sending the data to a remote device.

Block 202 illustrates receiving, from a device associated with a user, a request for data associated with offers corresponding to a plurality of products available for acquisition via a service provider. In at least one example, the communication module 124 associated with the server(s) 114 may receive a request for data associated with offers corresponding to a plurality of products. Each of the products in the plurality of products may be a same type of product. However, at least some of the products in the plurality of products may be associated with different product attributes.

In some examples, the request may be associated with a search query. For instance, a user 110 may enter a product type (e.g., a particular style of Brand A running shoes) into a search bar associated with the online marketplace. As a result, the user interface generation module 140 may send a request for data associated with offers corresponding to a plurality of products having the product type. In other examples, the request may be associated with a selection of a product type from a user interface that is presented to a user (e.g., homepage of the online marketplace, landing page associated with a product representative of the plurality of products, etc.). As a result, the user interface generation module 140 may send a request for data associated with offers corresponding to a plurality of products having the product type. In additional and/or alternative examples, the request may be associated with an actuation of a control on a user interface that enables a user to request additional information. As a result of the actuation, the user interface generation module 140 may send a request for data associated with the additional information.

Block 204 illustrates accessing, from a data store associated with the service provider, the data associated with the offers, the data including terms of the offers, product attributes associated with the plurality of products corresponding to the offers, and/or representative items associated with the plurality of products, product attributes, and/or terms of the offers. As described above, the service provider 102 may include a product database 128, which may store data associated with products that are available for acquisition via the service provider 102. That is, the product database 128 may be a comprehensive catalog of products that are available for acquisition via the service provider 102. In at least one example, each product, for which data is stored in the product database 128, may be associated with an offer. An offer may be associated with terms for acquiring a product associated with the offer, as described above. Non-limiting examples of terms of an offer may include a seller (e.g., merchant or service provider) offering the product for acquisition, a price, product attributes (e.g., dimensions, weight, materials, colors, etc.), a quantity available, shipping terms, payment terms, delivery options, etc. In at least one example, data associated with an offer for a product may be mapped to, or otherwise associated with, the data associated with the product in the product database 128.

Furthermore, the product attribute database 130 may store data associated with product attributes of individual products that are available for acquisition via the service provider 102. As described above, product attributes may include, but are not limited to, dimensions of a product, colors of a product, sizes of a product, amounts of storage available for a product, flavors of a product, etc. In at least one example, data associated with product attributes of a product may be mapped to, or otherwise associated with, data associated with the product in the product database 128.

The representative item database 132 may store representations of products, product attributes, and/or offer terms. In at least one example, a product, product attribute, and/or a term of an offer may be associated with a representative item. A representative item may be a textual representation or a graphical representation (e.g., graphic, image, etc.). In at least one example, representative items may be mapped to, or otherwise associated with, data associated with respective products, product attributes, or offer terms in the product attribute database 130 or product database 128, respectively.

Responsive to receiving the request, the communication module 124 may access, from the product database 128, the data associated with the offers corresponding to the plurality of products. Furthermore, the communication module 124 may access the product attribute database 130 and/or the representative item database 132 to access data associated with product attributes and/or representative items associated with the offers corresponding to the plurality of products. Accordingly, in at least one example, the data associated with the offers may include data associated with offer terms of each of the offers, product attributes associated with individual products of the plurality of products corresponding to the offers, and representative items associated with the offer terms, product attributes, and/or plurality of products.

Block 206 illustrates sending the data associated with the offers to the device. The communication module 124 may send the data associated with the offers to the user interface generation module 140 associated with device 112. The user interface generation module 140 may utilize the data to generate primary user interfaces and secondary user interfaces, as described below with reference to FIGS. 3-5.

FIG. 3 is a flow diagram showing an illustrative process 300 to generate a primary user interface and a secondary user interface and present the secondary user interface at least partially overlaying the primary user interface to provide a consolidated representation for same or similar products that are available for acquisition with variations of one or more product attributes.

Block 302 illustrates receiving data associated with offers corresponding to a plurality of products that are available for acquisition via an online marketplace. In at least one example, the user interface generation module 140 may request data associated with the offers corresponding to a plurality of products. Each of the products in the plurality of products may be a same type of product. However, at least some of the products in the plurality of products may be associated with different product attributes. As a non-limiting example, each of the products in the plurality of products may be a same style of Brand A running shoes. However, some of the running shoes may be associated with different sizes, colors, widths, etc.

In some examples, the request may be associated with a search query. For instance, a user 110 may enter a product type (e.g., a particular style of Brand A running shoes) into a search bar associated with the online marketplace. As a result, the user interface generation module 140 may send a request for data associated with offers corresponding to a plurality of products of the product type. In other examples, the request may be associated with a selection of a product type from a user interface that is presented to a user (e.g., homepage of the online marketplace, landing page associated with a product representative of the plurality of products, etc.). As a result, the user interface generation module 140 may send a request for data associated with offers corresponding to a plurality of products of the product type. In additional and/or alternative examples, the request may be associated with an actuation of a control on a user interface that enables a user to request additional information. As a result of the actuation, the user interface generation module 140 may send a request for data associated with the additional information.

Responsive to receiving the request, the communication module 124 may access, from the product database 128, the data associated with the offers associated with the plurality of products, as described above. The communication module 124 may send the data associated with the offers to the user interface generation module 140. In at least one example, the data associated with the offers may include data associated with offer terms of each of the offers, product attributes associated with individual products of the plurality of products corresponding to the offers, and representative items associated with the offer terms, product attributes, and/or plurality of products.

Block 304 illustrates aggregating product attributes associated with the offers to generate aggregated product attributes. As described above, the product attribute database 130 may store data associated with product attributes of individual products that are available for acquisition via the service provider 102. As described above, product attributes may include, but are not limited to, dimensions of a product, colors of a product, sizes of a product, amounts of storage available for a product, flavors of a product, etc. In at least one example, the user interface generation module 140 may receive data associated with product attributes of the plurality of products. The user interface generation module 140 may aggregate the product attributes for the plurality of products to generate aggregated product attributes.

Block 306 illustrates determining a representative offer of the offers, the representative offer being associated with a first product having a product attribute. In at least one example, the user interface generation module 140 may determine a representative offer of the offers. In some examples, the user interface generation module 140 may leverage a machine learning mechanism to determine which offer is objectively the best offer and may determine that the best offer is the representative offer. In other examples, the user interface generation module 140 may leverage a machine learning mechanism to determine which offer is a best offer for a particular user and may determine that the best offer for the particular user is the representative offer.

Machine learning may refer to one or more programs that learns from the data it receives. For example, a machine learning mechanism may build, modify, or otherwise utilize a data model that is created from example inputs and makes predictions or decisions using the data model. In the current example, the machine learning mechanism may be used to predict a best offer. The data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

In some examples, the machine learning mechanism may determine which offer is objectively the best offer based on prices associated with offers, seller ratings associated with offers, quality of the products associated with offers, shipping terms associated with offers, delivery terms associated with offers, etc. In other examples, the machine learning mechanism may determine which offer is the best offer for a particular user based at least in part on accessing data associated with the particular user. For instance, the user interface generation module 140 may access data associated with the particular user from a profile associated with the particular user. The profile may include data associated with user preferences, previous interactions between the particular user and the service provider 102, etc. Based at least in part on the data associated with user preferences, previous interactions between the particular user and the service provider 102, the machine learning mechanism may learn which offers correspond to the best offers for the particular user. For instance, data associated with a user profile may indicate that a particular user generally pays more for a product as long as the product is eligible for two-day, free shipping. Accordingly, the machine learning mechanism may determine that an offer associated with a product that is priced slightly higher than another product of the same type, but is eligible for two-day, free shipping may be the best offer for the particular user (despite the fact that the product costs slightly more than another product of the same type).

Block 308 illustrates determining, based at least in part on the aggregated product attributes, that second products with alternate product attributes are available. In at least one example, the user interface generation module 140 may utilize the aggregated product attributes to determine what variations of product attributes are available and may add information to the primary user interface to communicate the variations of product attributes that are available. For instance, for the particular style of Brand A shoes described above, the aggregated product attributes may indicate that the shoes are available in five colors, eight sizes, and three widths.

Block 310 illustrates generating a primary user interface to present the representative offer. As described above, the representative item database 132 may include representative items corresponding to products, product attributes, terms of offers, etc. In at least one example, a product attribute may be associated with a textual representation or a graphical representation (e.g., graphic, image, etc.). The communication module 124 may access the representative item database 132 and may send data associated with representative item(s) that are associated with the representative offer (e.g., product, product attributes, terms of the offer, etc.) to the user interface generation module 140. The user interface generation module 140 may receive representative item(s) that are associated with a product attribute associated with the representative offer. The user interface generation module 140 may organize the various representative items in a user interface configuration using various technologies (e.g., hypertext transfer, other protocols, etc.).

In at least one example, the primary user interface may correspond to a product page. The product page may include a first representative item associated with the product and one or more second representative items associated with a product attribute of the product and/or terms of the corresponding offer. In some examples, the first representative item and a second representative item may be associated with a same representative item that represents the product having the product attribute.

As described above, in at least one example, the user interface generation module 140 may determine, based at least in part on the aggregated product attributes, that second product(s) having alternate product attributes are available. Based at least in part on such a determination, the user interface generation module 140 may add an indication to the primary user interface signaling that there are alternate products having alternate product attributes available. The indication may be a control, hyperlink, or other mechanism. Additionally, the user interface generation module 140 may add information to the primary user interface to communicate the variations of product attributes that are available.

Block 312 illustrates presenting the primary user interface via a display of a device associated with a user. The user interface generation module 140 may provide instructions to the presentation module 142, which may receive the instructions and may present the primary user interface pursuant to the instructions via the display 138 of the device 112.

Block 314 illustrates determining a request for information associated with second product(s) having alternate product attributes. In at least one example, the user 110 may interact with the primary user interface indicating a desire to access information associated with second product(s) having alternate product attributes. For instance, the user 110 may actuate the control, hyperlink, etc. signaling that there are second products having alternate product attributes available. Based at least in part on determining an interaction with the primary user interface indicating a desire to access information associated with second product(s) having alternate product attributes, the user interface generation module 140 may determine a request for information associated with second product(s) having alternate product attributes.

Block 316 illustrates generating a secondary user interface, the secondary user interface including one or more swatches associated with the alternate product(s). In at least one example, the user interface generation module 140 may access the aggregated product attributes described above.

Based at least in part on the aggregated product attributes, the user interface generation module 140 may identify variations of product attributes. That is, for a particular product attribute, the user interface generation module 140 may identify each of the variations of the particular product attribute that is available. For each variation of the particular product attribute, the user interface generation module 140 may determine a representative offer. Example techniques for determining representative offers are described above with reference to block 206. Based at least in part on determining a representative offer for a variation of a particular product attribute, the user interface generation module 140 may generate a swatch for representing the variation of the particular product attribute via the secondary user interface. A swatch may include a representative item associated with the variation of the particular product attribute. In at least one example, the swatch may include additional information associated with the representative offer. For instance, a swatch may include one or more terms of the representative offer. In some examples, the additional information may be customized for the user 110.

That is, in at least one example, the user interface generation module 140 may leverage a machine learning mechanism to determine additional information that is to be presented with a swatch. As described above, machine learning may refer to one or more programs that learns from the data it receives. For example, a machine learning mechanism may build, modify, or otherwise utilize a data model that is created from example inputs and makes predictions or decisions using the data model. In the current example, the machine learning mechanism may be used to predict what type (and how much) additional information is to be included in a swatch based on preferences of a particular user. The data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, the machine learning mechanism may determine what type (and how much) additional information is to be included in a swatch based on preferences of a particular user. For instance, the user interface generation module 140 may access data associated with the particular user from a profile associated with the particular user. The profile may include data associated with user preferences, previous interactions between the particular user and the service provider 102, previous interactions between the particular user and various user interfaces, etc. Based at least in part on the data associated with the user profile, the machine learning mechanism may learn which type(s) of additional information are important to the particular user. For instance, data associated with a user profile may indicate that a particular user generally looks at price per unit (e.g., $0.66/ounce). Accordingly, the machine learning mechanism may learn that information associated with the price per unit in a swatch is to be presented to the particular user. As such, the user interface generation module 140 may include information associated with the price per unit in a swatch that is to be presented to the particular user when it is available.

Swatches may have various configurations. In at least one example, a configuration of a swatch may depend on whether a textual representation or a graphical representation is available for the representative offer. For instance, the user interface generation module 140 may determine the dimensions of a swatch based on whether a representative item is a textual representation or a graphical representation. In additional and/or alternative examples, a configuration of a swatch may depend on the additional information that is presented with the swatch. For instance, the user interface generation module 140 may determine the dimensions of a swatch based on an amount of text that is to be presented in the swatch. As a non-limiting example, if a product description associated with a product is above a threshold length, the length of a corresponding swatch may be longer than the length of a swatch for a product with a product description that is below a threshold length. In some examples, a description of a product that exceeds a threshold may not be able to fit within a swatch. In such examples, a swatch may be configured such that a portion of the description of the product may fade towards one edge of the swatch (e.g., the right edge) to provide a visual cue to a user 110 that the description of the product doesn't fit within the swatch, but that more information is available. That is, in some examples a portion of a textual representation may be truncated based on the length of the textual representation and the dimensions of a swatch.

The user interface generation module 140 may organize the various representative items in a user interface configuration using various technologies (e.g., hypertext transfer, other protocols, etc.). In at least one example, a product may be associated with multiple variations of a particular product attribute. In at least one example, the user interface generation module 140 may generate swatches for each variation of a product attribute. In some examples, if the number of variations of a product attribute exceeds a threshold, the user interface generation module 140 may select a predetermined number of variations to represent via the secondary user interface. In some examples, the user interface generation module 140 may select variations that are most frequently purchases, variations that are associated with the best offers, variations that are determined to be preferential to the user 110, etc.

In some examples, a portion of the swatches may be presented via the secondary user interface at one time. In at least one example, a number of swatches that comprise the portion of swatches may be determined based on a size of the display. In such an example, the user interface generation module 140 may determine an order for arranging the swatches based at least in part on prioritizing swatches representing offers that are acquired at a frequency above a threshold, associated with the best offers, preferential to the user 110, etc. In examples where fewer than all swatches are presented via the secondary user interface, swatches that are not currently presented may be accessible based on interactions with the user interface. For instance, a user may scroll through the swatches to cause swatches that are currently presented to move out of view and swatches that are not currently in view to come into view. In some examples, various visual cues are used to signal to the user 110 that additional swatches are available for viewing. Examples of secondary user interfaces are shown below with reference to FIGS. 6A-D, 7, 8A, and 8B.

In at least one example, based at least in part on determining that the number of variations of a product attribute exceeds a threshold, the user interface generation module 140 may determine to change the configuration of how representative swatches are presented via the secondary user interface. For instance, in some examples, the user interface generation module 140 may determine to present the representative swatches in a grid to accommodate the large number of variations (instead of linearly, or some other configuration).

In some examples, the secondary user interface may present swatches associated with multiple product attributes. For instance, a first set of swatches may be associated with various sizes and a second set of swatches may be associated with various colors. Additional details associated with such secondary user interfaces are described below with reference to FIGS. 5, 8A, and 8B.

Block 318 illustrates presenting the secondary user interface via the display, the secondary user interface overlaying at least a portion of the primary user interface. As described above, the user interface generation module 140 may provide data associated with the secondary user interface to the presentation module 142 which may present the secondary user interface pursuant to the instructions. In at least one example, the presentation module 142 may present the secondary user interface such that it overlays at least a portion of the primary user interface. In some examples, the secondary user interface may overlay a bottom portion of the primary user interface. In other examples, the secondary user interface may overlay a left portion of the primary user interface, a right portion of the primary user interface, a top portion of the primary user interface, a middle portion of the primary user interface, etc. In at least one example, the presentation module 142 may position the secondary user interface such that it does not obstruct the representative item associated with the primary user interface. In some examples, the presentation module 142 may cause the primary user interface to shift to ensure that the secondary user interface does not obstruct the representative item associated with the primary user interface.

Block 320 illustrates causing an effect to be applied to the primary user interface to deemphasize the primary user interface while the secondary user interface is presented. Based at least in part on causing the secondary user interface to be presented via the display of the device, the user interface generation module 140 may send instructions to the presentation module 142 which may cause a layer having a degree of opaqueness to overlay the primary user interface. As a result, a portion of the primary user interface that is visible may appear to be in a shadow. In an additional and/or alternative example, the presentation module 142 may reduce the size or brightness of the features of the primary user interface 146. Each of the aforementioned effects may cause the primary user interface to be deemphasized. As mentioned above, additional and/or alternative effects may be utilized by the presentation module 142 to deemphasize the primary user interface. Deemphasizing the primary user interface may provide a visual signal to the user 110 that the primary user interface is not active.

Block 322 illustrates determining a selection of a swatch of the swatches associated with a second product having an alternate product attribute. In some examples, the secondary user interface may present swatches that are representative of multiple product attributes of a same type of product. As described above, a swatch may represent a representative offer for a product having a particular product attribute. Individual swatches presented via the secondary user interface may be associated with different variations of a particular product attribute. In at least one example, a user 110 may provide touch input, speech input, gaze input, etc., which may indicate a selection of a swatch. The swatch may be associated with a second product having an alternate product attribute. In at least one example, the presentation module 142 may detect the touch input, speech input, gaze input, etc. and may determine a selection of the swatch associated with the second product.

Block 324 illustrates updating the primary user interface to reflect the second product having the alternate product attribute. In at least one example, based at least in part on the user 110 selecting the swatch, the user interface generation module 140 can determine to update the primary user interface to depict a representation of the second product corresponding to the offer associated with the selected swatch. The user interface generation module 140 may access data associated with the swatch to update the primary user interface. In at least one example, the presentation module 142 may update a representation of a product presented via the primary user interface and other offer terms that may have changed as a result of the user 110 selecting the swatch.

Figure 4:
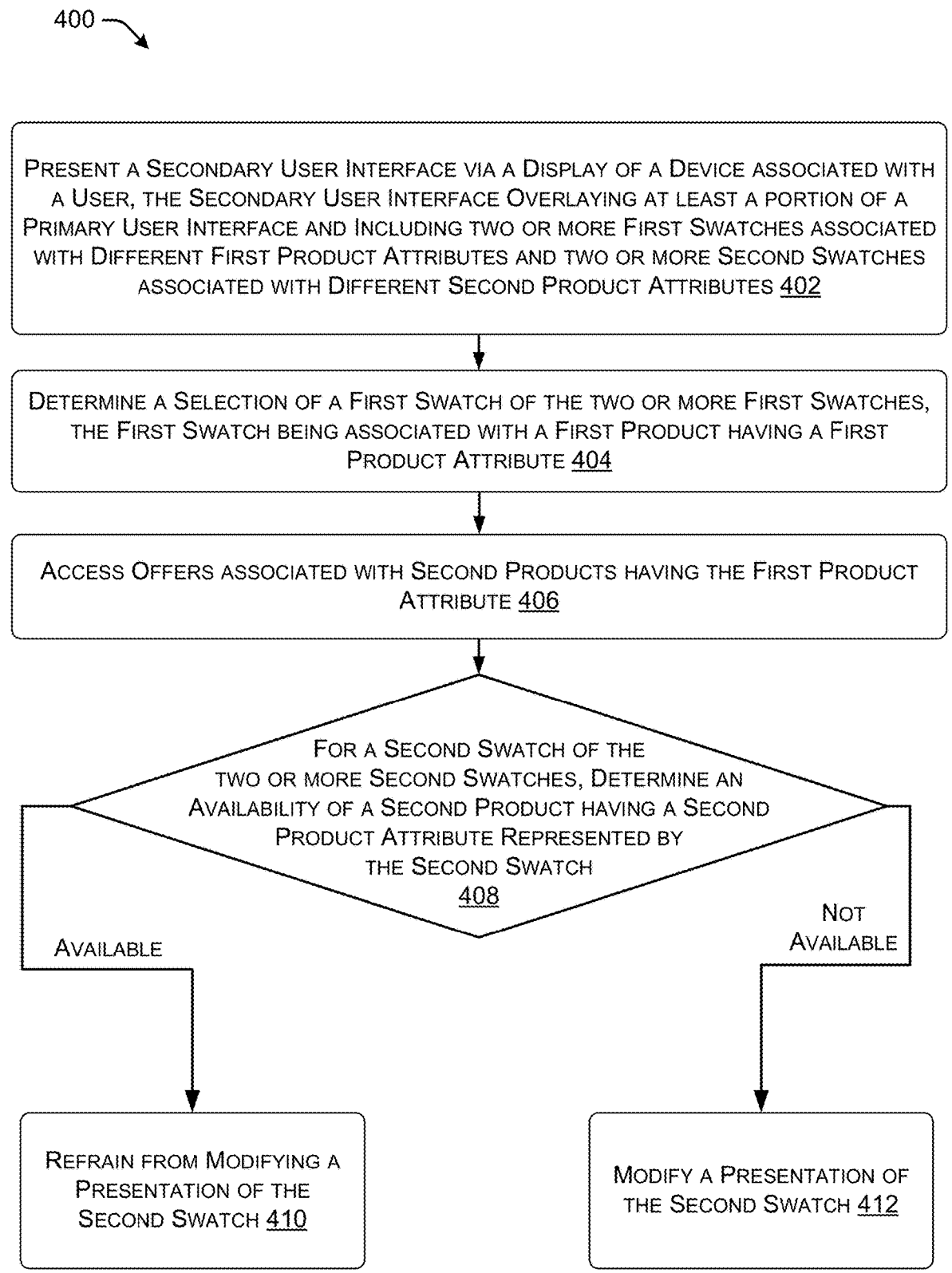
FIG. 4 is a flow diagram showing an illustrative process to update swatches presented via a secondary user interface based at least in part on selections of product attributes associated with a product.

FIG. 4 is a flow diagram showing an illustrative process 400 to update swatches presented via a secondary user interface based at least in part on selections of product attributes associated with a product.

Block 402 illustrates presenting a secondary user interface via a display of a device associated with a user, the secondary user interface overlaying at least a portion of a primary user interface and including two or more first swatches associated with different first product attributes and two or more second swatches associated with different second product attributes. As described above, the presentation module 142 associated with the device 112 may receive instructions for presenting the secondary user interface from the user interface generation module 140 and may present a secondary user interface pursuant to the instructions. In at least one example, the presentation module 142 may present the secondary user interface such that it overlays at least a portion of the primary user interface, as described above.

In some examples, the secondary user interface may present swatches that are representative of variations of product attributes of a same type of product. As described above, a swatch may represent a representative offer for a product having a particular product attribute. Individual swatches presented via the secondary user interface may be associated with different variations of a particular product attribute. As described above, in some examples, a secondary user interface may present swatches associated with variations of two or more product attributes. For instance, in a non-limiting example, two or more first swatches may be associated with variations of a first product attribute (e.g., various sizes) of a particular Brand B sweater and two or more second swatches may be associated with variations of a second product attribute (e.g., various colors) of the particular Brand B sweater. The two or more first swatches may have a first configuration and the two or more second swatches may have a second configuration. The first configuration and the second configuration may be the same or may be different. A user may interact with each set of swatches independently.

Block 404 illustrates determining a selection of a first swatch of the two or more first swatches, the first swatch being associated with a first product having a first product attribute. In at least one example, a user 110 may select a first swatch of the two or more first swatches. In some examples, a user 110 may provide touch input, speech input, gaze input, etc., which may indicate a selection of a first swatch. The first swatch may be associated with a first product having a first product attribute. As a non-limiting example, a user 110 may select a first swatch corresponding to a size medium of the particular Brand B sweater, described above. That is, the user 110 may select a first swatch that is representative of a representative offer for the particular Brand B sweater in a size medium. In at least one example, the user interface generation module 140 may determine a selection of a first swatch.

Block 406 illustrates accessing offers associated with second products having the first product attribute. As described above, the user interface generation module 140 may receive data associated with offers corresponding to a plurality of products. Based at least in part on the user 110 selecting a first swatch associated with a first product having a first product attribute, the user interface generation module 140 may access data associated with offers corresponding to second products having the first product attribute. That is, the user interface generation module 140 may identify second products that are associated with the first product attribute. Then, the user interface generation module 140 may access data, including terms of offers, that is associated with the second products 128. As a non-limiting example, based at least in part on the user 110 selecting a size medium for the particular Brand B sweater, the user interface generation module 140 may access offers associated with the particular Brand B sweater in size medium.

Block 408 illustrates for a second swatch of the two or more second swatches, determining availability of a second product having a second product attribute represented by the second swatch. In at least one example, a second swatch of the two or more second swatches may represent a representative offer for a second product having a variation of a second product attribute. Based at least in part on accessing the data, including terms of offers, that is associated with the second products, the user interface generation module 140 may determine the availability of the second product represented by the second swatch. That is, the user interface generation module 140 may determine whether the second product is available (e.g., in stock) for the variation of the second product attribute represented by the swatch in view of the user's selection of the first attribute. As a non-limiting example, based at least in part on the user 110 selecting a size medium for the particular Brand B sweater, the user interface generation module 140 may access offers associated with the particular Brand B sweater to determine the availability of the particular Brand B sweater in size medium in a particular color represented by a swatch.

Based at least in part on determining that a second product is available with the second product attribute (and the first product attribute), the user interface generation module 140 may refrain from modifying a presentation of the second swatch, as illustrated by block 410. Based at least in part on determining that a second product is not available with the second product attribute (and the first product attribute), the user interface generation module 140 may modify a presentation of the second swatch, as illustrated by block 412. For instance, the user interface generation module 140 may cause a graphical representation of a strike-through to be placed over the second swatch, cause a layer having a degree of opaqueness to be placed over the second swatch, cause representative items associated with the second swatch to be reduced in size, etc. That is, in at least one example, the user interface generation module 140 may modify the presentation of the second swatch to provide a visual cue to a user 110 that a product having the first attribute is not available with the second product attribute.

In at least one example, the user interface generation module 140 may determine an availability of a second product for each second swatch in the two or more second swatches. That is, based at least in part on a user selection of a first product attribute, the user interface generation module 140 may update the presentation of the two or more second swatches to communicate to the user 110 which products are available that have the first product attribute and each variation of the second product attribute. An example of a secondary user interface having two or more visual cues indicating the availability of a product having multiple product attributes is shown below with reference to FIGS. 8A and 8B.

It should be noted that while process 400 is directed to a secondary user interface presenting swatches associated two different product attributes, swatches representing variations in any number of product attributes may be presented via a secondary user interface. For instance, in a non-limiting example, a secondary user interface may include first swatches representing variations of a first product attribute, second swatches representing variations of a second product attribute, third swatches representing variations of a third product attribute, etc.

Furthermore, in at least one example, a user 110 may select a swatch corresponding to an unavailable product. That is, a product with a product attribute represented by the swatch may not be in stock. In such examples, the user interface generation module 140 may access offers associated with alternate products having the product attribute and may identify alternate products having the product attribute that are available. The user interface generation module 140 may update the secondary user interface to reflect products that are available and have the product attribute selected. In some examples, if the available products are associated with variations of another product attribute, swatches representative of the available products may be presented via the secondary user interface.

FIG. 5 is a flow diagram showing an illustrative process 500 to restore a primary user interface to an original presentation.

Block 502 illustrates determining that a user is finished interacting with a secondary user interface overlaying at least a portion of a primary user interface, the primary user interface subject to at least one effect to deemphasize the primary user interface. As described above, the presentation module 142 associated with device 112 may present a secondary user interface pursuant to the instructions received from the user interface generation module 140. In at least one example, the presentation module 142 may present the secondary user interface such that it overlays at least a portion of the primary user interface.

In at least one example, based at least in part on causing the secondary user interface to be presented via the display of the device, the presentation module 142 may cause an effect to be applied to the primary user interface. In at least one example, the presentation module 142 may cause a layer having a degree of opaqueness to overlay the primary user interface. As a result, a portion of the primary user interface that is visible may appear to be in a shadow. In an additional and/or alternative example, the presentation module 142 may reduce the size or brightness of the features of the primary user interface. Each of the aforementioned effects may cause the primary user interface to be deemphasized and provide a visual cue that the primary user interface is not active.

In at least one example, the presentation module 142 may determine that a user 110 is no longer browsing the secondary user interface. For instance, in at least one example, the secondary user interface may be associated with a control, hyperlink, or other mechanism that a user 110 may actuate to indicate that he or she is finished browsing the secondary user interface. In other examples, the presentation module 142 may determine that a period of inactivity exceeds a predetermined threshold indicating that a user 110 is no longer interacting with the secondary user interface. In additional and/or alternative examples, other indicators such as gaze tracking, etc. may be used to determine that a user 110 is no longer browsing the secondary user interface. In some examples, a user 110 may interact with a portion of the primary user interface, indicating that the user 110 is no longer browsing the secondary user interface. In at least one example, the presentation module 142 may determine that the user 110 is no longer interacting with the secondary user interface.

Block 504 illustrates terminating a presentation of the secondary user interface. Based at least in part on determining that the user 110 is no longer browsing the secondary user interface, the presentation module 142 may terminate the presentation of the secondary user interface. That is, the presentation module 142 may cause the secondary user interface to be retracted.

Block 506 illustrates removing the effect associated with the primary user interface. Based at least in part on determining that the user 110 is no longer browsing the secondary user interface, the presentation module 142 may restore the original presentation of the primary user interface. For instance, the presentation module 142 may remove the layer having a degree of opaqueness that is overlaying the primary user interface. Or, the presentation module 142 may cause features of the primary user interface to return to their original size or brightness.

As described above, in at least one example, a user 110 may select an alternate product having an alternate product attribute via interactions with the secondary user interface. In such examples, if the user 110 selects an alternate product having alternate product attribute(s), the primary user interface may be updated to reflect an offer associated with the alternate product having the alternate product attribute(s). Accordingly, when the primary user interface returns to its original presentation, the primary user interface may reflect an offer associated with the alternate product having the alternate product attribute(s).

FIGS. 6A-D, 7, 8A, and 8B illustrate example user interfaces that provide a consolidated representation for same or similar products that are available for acquisition with variations of one or more product attributes.

FIGS. 6A-6D illustrate example user interfaces that provide a consolidated representation for same or similar products that are available for acquisition with variations of one or more product attributes. FIGS. 6A-6D show examples of one or more user interfaces that may be presented via a display 138 of a device 112.

Figures 6A, 6B:
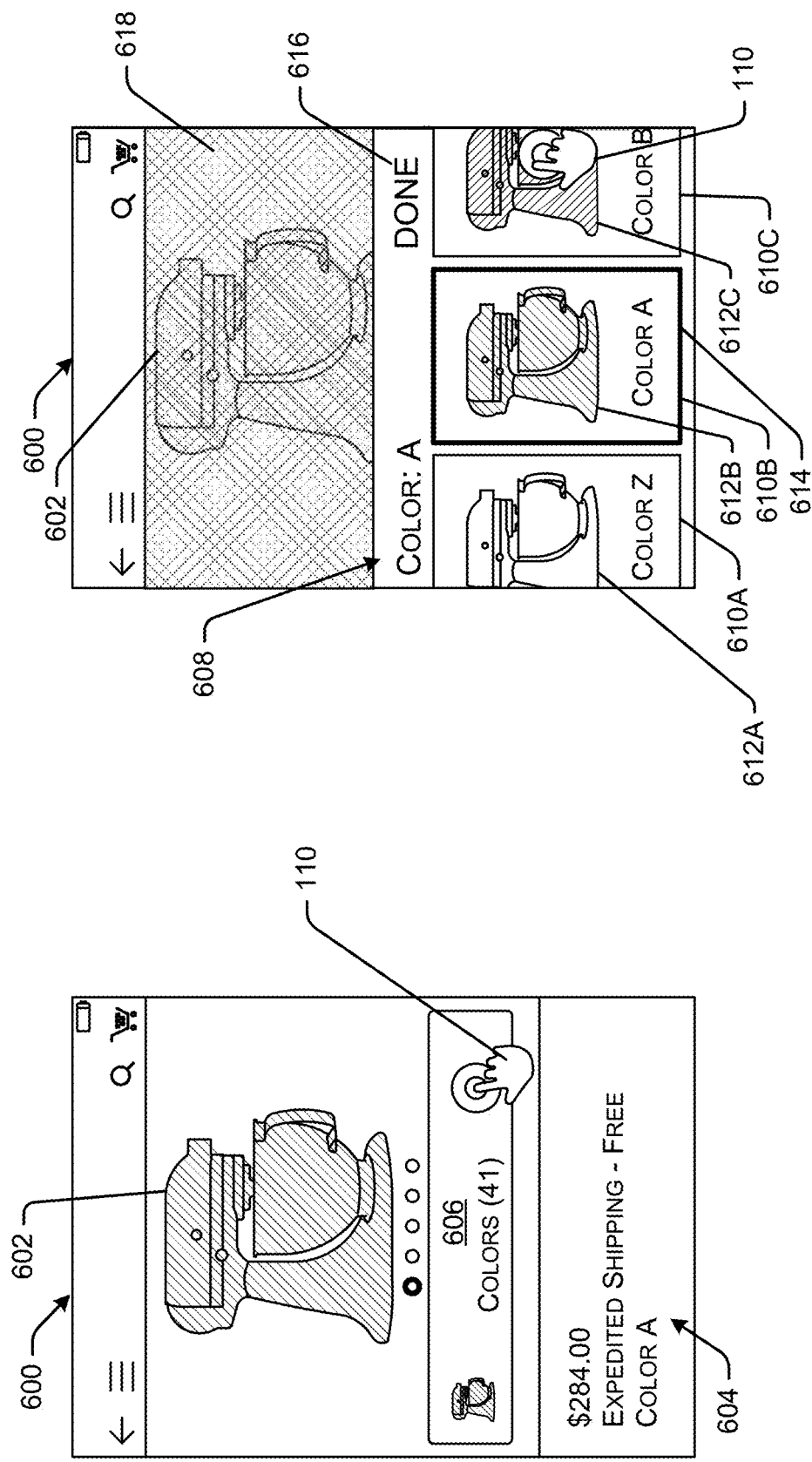
FIG. 6A illustrates an example of a primary user interface that presents an offer associated with a product that is available for acquisition.
FIG. 6B illustrates an example of user interfaces that provide a consolidated representation for same or similar products that are available for acquisition with variations of one or more product attributes.

FIG. 6A is a non-limiting example of a primary user interface 600. As described above, primary user interface 600 may be associated with a representative offer for a product, in this example, a mixer. As illustrated, primary user interface 600 includes a representative item 602 (e.g., a graphical representation) of the mixer. The mixer may be associated with a product attribute, such as color, that can be varied. That is, the mixer may be sold in different colors. As illustrated, the offer associated with the primary user interface 600 is for a mixer in Color A. Representative items 604 associated with offer terms of the offer indicate that the mixer is available for $284.00 and may be eligible for free expedited shipping. As described above, a primary user interface may include an indication to the primary user interface signaling that there are alternate products having alternate product attributes available. The indication may be a control, hyperlink, or other mechanism. Primary user interface 600 includes a non-limiting example of a control 606 indicating that there are other mixers available in alternate colors.

As described above, a user 110 may interact with the primary user interface 600 indicating a desire to access information associated with alternate product(s) having alternate product attributes. For instance, the user 110 may actuate the control 606. Based at least in part on determining an interaction with the primary user interface 600 indicating a desire to access information associated with alternate product(s) having alternate product attributes, a secondary user interface associated with alternate product(s) having alternate product attributes may be generated.

FIG. 6B is a non-limiting example of a secondary user interface 608 overlaying at least a portion of the primary user interface 600. As described above, in some examples, the secondary user interface 608 may overlay a bottom portion of the primary user interface 600, as illustrated in FIG. 6B. In other examples, the secondary user interface 608 may overlay a left portion of the primary user interface 600, a right portion of the primary user interface 600, a top portion of the primary user interface 600, a middle portion of the primary user interface 600, etc. In at least one example, the presentation module 142 may position the secondary user interface 608 such that it does not obstruct the representative item associated with the primary user interface 600. That is, as shown in FIG. 6B, the secondary user interface 608 is positioned such that the representative item 602 is substantially unobstructed.

As described above, the secondary user interface 608 may include two or more swatches. Each swatch may represent a representative offer for a product that is associated with a variation of a product attribute. In FIG. 6B, swatch 610A is associated with a mixer (i.e., a same type of mixer as the mixer shown in the primary user interface 600) in Color Z. That is, swatch 610A is associated with a representative offer for a mixer in Color Z. Swatch 610B is associated with the mixer in Color A. That is, swatch 610 B is associated with the same product that is presented via the primary user interface 600. Swatch 610C is associated with a mixer (i.e., a same type of mixer as the mixer shown in the primary user interface 600) in Color B. That is, swatch 610C is associated with a representative offer for a mixer in Color B. In at least one example, the swatches (e.g., swatch 610A, swatch 610B, and swatch 610C) may be arranged in a linear arrangement to enable a user 110 to swipe, scroll, or otherwise browse through the swatches. In some examples, individual of the swatches (e.g., swatch 610A, swatch 610B, and swatch 610C) may include visual cues to notify a user 110 that additional options are available. For instance, swatch 612C is shown as being at least partially out of the display area. Such a visual cue may indicate that there are additional swatches available for browsing. In additional and/or alternative examples, swatches may be arranged in a grid (e.g., to accommodate a number of swatches above a threshold), or some other configuration.

As illustrated each swatch (e.g., swatch 610A, swatch 610B, and swatch 610C) may include a representative item 612A, 612B, and 612C, respectively. The representative items 612A, 612B, and 612C may depict a variation of a mixer having a different color. In FIG. 6, each swatch (e.g., swatch 610A, swatch 610B, and swatch 610C) may also include representative items associated with each of the representative offers.

In at least one example, a visual cue may indicate which swatch is currently selected. In FIG. 6B, swatch 610B is currently selected. In at least one example, when the secondary user interface 608 is initially presented, a swatch corresponding to the representative offer presented in the primary user interface 600 may be selected as a default. As shown in FIG. 6, swatch 610B is surrounded by a thick black line 614 to indicate that it is currently selected. Various other visual cues may be used to signal which swatch is selected by a user 110. The secondary user interface 608 may also include a control 616, or alternatively a hyperlink or other mechanism, that a user 110 may actuate to indicate that he or she is finished browsing the secondary user interface 608.

As described above, in some examples, based at least in part on causing the secondary user interface 608 to be presented, an effect may be applied to the primary user interface 600. As shown in FIG. 6, a layer 618 having a degree of opaqueness is applied to the primary user interface 600, causing the visible portion of the primary user interface 600 to appear to be in a shadow. Such a visual cue may indicate to the user 110 that the primary user interface 600 is not active.

In FIG. 6B, the user 110 is interacting with swatch 610C, corresponding to a mixer in Color B. Based at least in part on the user 110 interacting with swatch 610C, the secondary user interface 608 may depict the swatches (e.g., swatch 610A, swatch 610B, and swatch 610C) in a different position and/or order so that the selected swatch, swatch 610C is in the middle of the swatches (e.g., swatch 610A, swatch 610B, and swatch 610C), as illustrated in FIG. 6C.

Figure 6D:
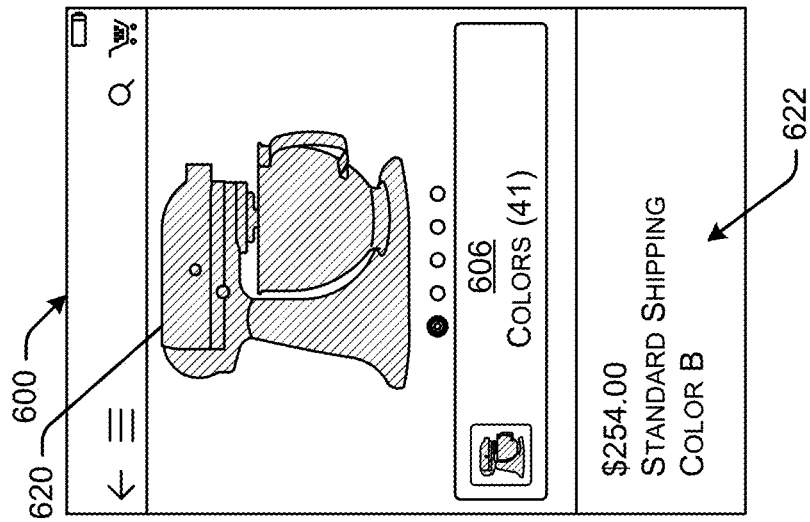
FIG. 6D illustrates an example of a primary user interface that presents an offer associated with a product that is available for acquisition.
Figure 6C:
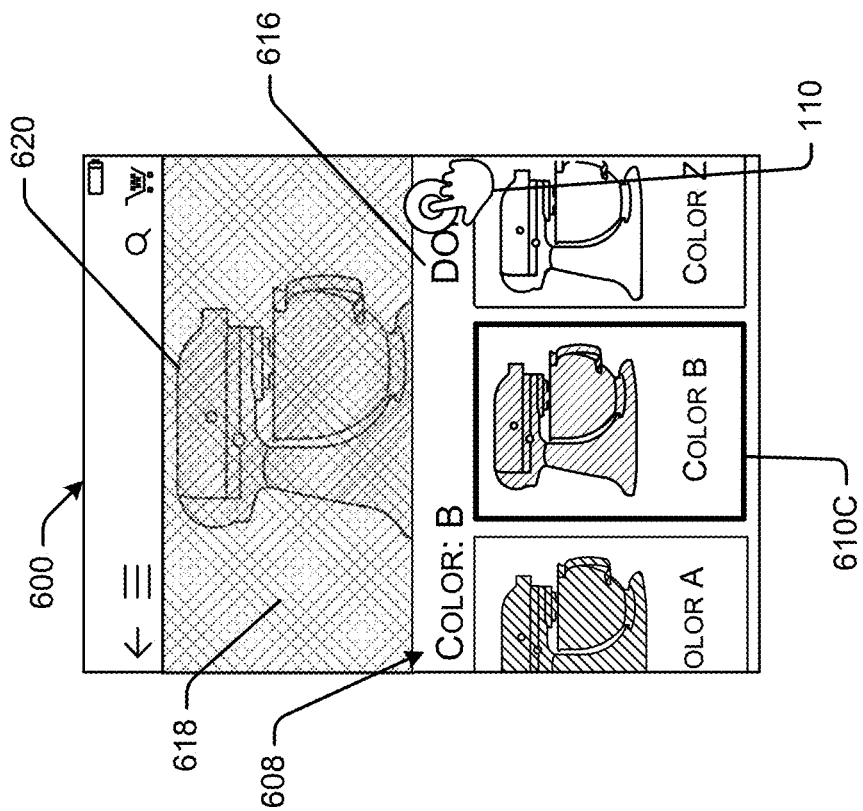
FIG. 6C illustrates an example of user interfaces that provide a consolidated representation for same or similar products that are available for acquisition with variations of one or more product attributes.

FIG. 6C shows the secondary user interface 608 overlaying at least a portion of the primary user interface 600. As shown, swatch 610C is now centered in the swatches. Additionally, the representative item depicted in the primary user interface 600 may be updated to reflect the product attribute associated with the selected swatch 610C. That is, a new representative item 620 may be presented instead of the representative item 602 that was originally presented via the primary user interface 600. As shown in FIG. 6C, new representative item 620 may depict the mixer in Color B, instead of Color A.

The user 110 may interact with control 616 to indicate that he or she is finished browsing the swatches (e.g., swatch 610A, swatch 610B, and swatch 610C). Accordingly, the secondary user interface 608 may be retracted and the layer 618 may be removed such that the primary user interface 600 returns to its original presentation. In at least one example, however, the primary user interface 600 now depicts the new representative item 620 (i.e., a mixer in Color B) and may include updated representative items 622 associated with offer terms corresponding to the offer associated with swatch 610C.

As shown in FIG. 6D, the primary user interface 600 is updated to present an offer associated with a mixer in Color B. The offer associated with the mixer in Color B includes terms indicating that a user 110 may acquire the mixer for $254.00 and the mixer will be shipped via standard shipping.

Figure 7:
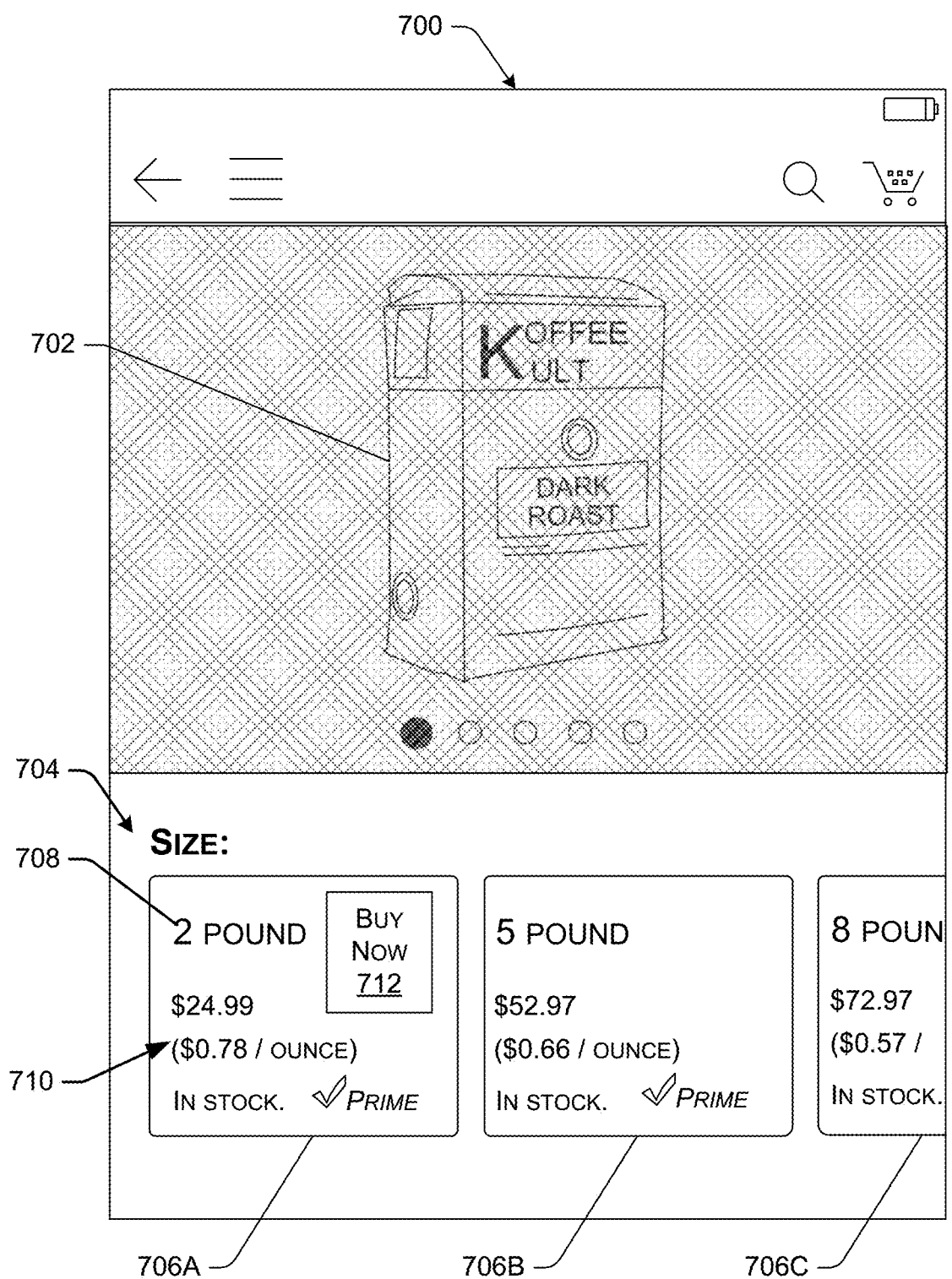
FIG. 7 illustrates an example of user interfaces that provide a consolidated representation for same or similar products that are available for acquisition with variations of one or more product attributes.

FIG. 7 illustrates another example of user interfaces that provide a consolidated representation for same or similar products that are available for acquisition with variations of one or more product attributes. FIG. 7 illustrates a non-limiting example of a primary user interface 700 presenting an offer associated with coffee. The primary user interface 700 may include a representative item 702 of the coffee. As shown, a secondary user interface 704 is shown as overlaying at least a portion of the primary user interface 700. The secondary user interface 704 shows three swatches, swatch 706A, swatch 706B, and swatch 706C. As shown swatch 706A represents a representative offer for a two-pound bag of coffee, swatch 706B represents a representative offer for a five-pound bag of coffee, and swatch 706C represents a representative offer for an eight-pound bag of coffee.

In at least one example, the configuration of the swatches (e.g., swatch 706A, swatch 706B, and swatch 706C) may be determined based on the type of representative item(s) that is available (e.g., graphical or textual) and/or a type or amount of additional information that is presented with each swatch. For instance, in FIG. 7, a graphical representation of the various sizes of the coffee may not be available. Accordingly, a textual representation (e.g., textual representation 708) may be used, as is shown. Additionally, representative items 710 associated with the terms of the offer corresponding to swatch 706A may also be associated with the swatch 706A. In FIG. 7, representative items 710 associated with the offer terms may include a price per ounce term, which may not be available or relevant for other products. Accordingly, the swatches (e.g., swatch 706A, swatch 706B, and swatch 706C) may have a taller height than swatches associated with other offers where the price per ounce term is not available or is not relevant. That is, the dimension of the swatches presented in secondary user interface 704 may have a particular configuration based on presenting the price per ounce term and/or the textual representation of the various sizes of the coffee.

In at least one example, as shown in FIG. 7, a swatch (e.g., swatch 706A) may be associated with a control 712, or alternatively a hyperlink or other mechanism, that enables a user 110 to buy the product associated with the swatch by actuating the control. In alternative examples, the secondary user interface may have a control, or alternatively a hyperlink or other mechanism, that enables a user 110 to buy the product associated with a selected swatch (or swatches) by actuating the control.

Figure 8B:
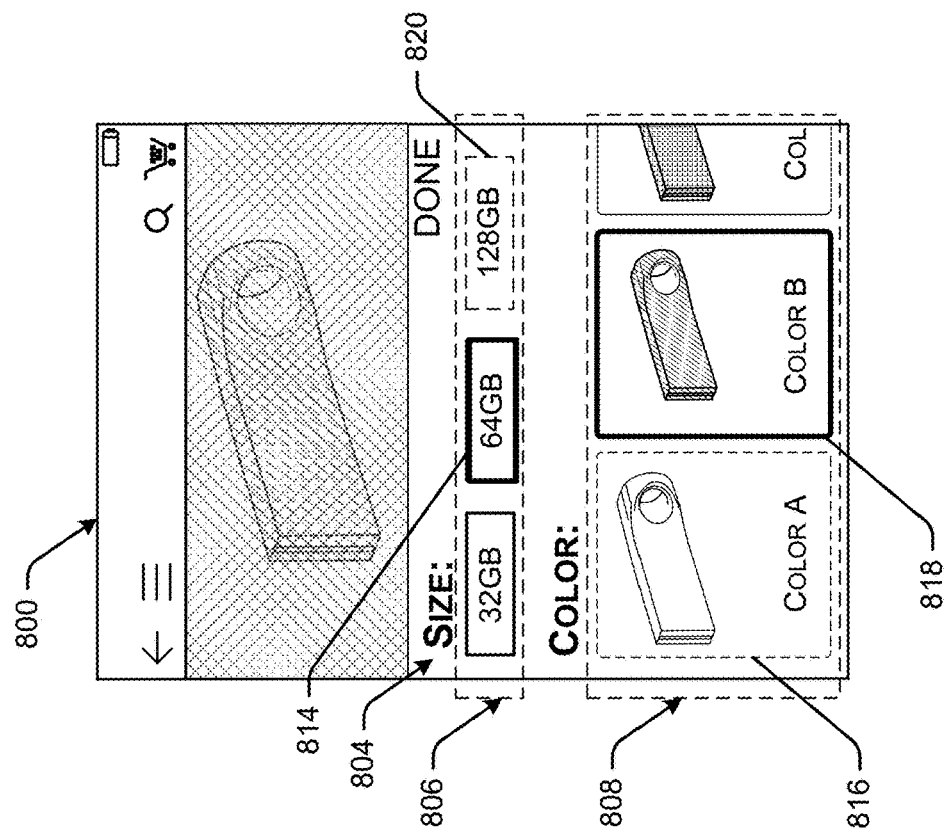
FIG. 8B illustrates an example of user interfaces that provide a consolidated representation for same or similar products that are available for acquisition with variations of one or more product attributes.
Figure 8A:
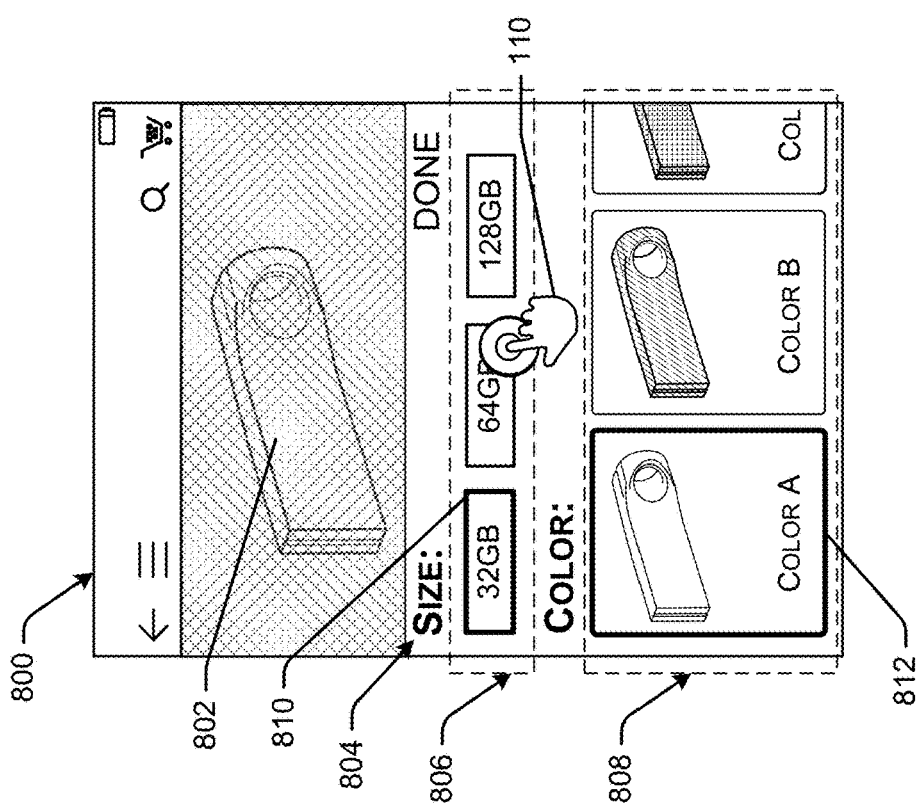
FIG. 8A illustrates an example of user interfaces that provide a consolidated representation for same or similar products that are available for acquisition with variations of one or more product attributes.

FIGS. 8A and 8B illustrate examples of user interfaces that provide a consolidated representation for same or similar products that are available for acquisition with variations of one or more product attributes. As described above, in at least one example, a product may be associated with two or more product attributes that may be varied. FIGS. 8A and 8B show examples of user interfaces that may be presented via a display 138 of a device 112.

FIG. 8A illustrates an example of a primary user interface 800 representing a representative offer associated with a product, which in this example is a USB drive. The primary user interface 800 may include a representative item 802 associated with the USB drive. In FIG. 8A, a secondary user interface 804 is presented overlaying at least a portion of the primary user interface 800. In at least one example, the USB drive may be available in different storage capacities and different colors. That is, the product (e.g., the USB drive) may be associated with two different product attributes that may be varied. Accordingly, in such examples, the secondary user interface 804 may present multiple sets of swatches. Each set of swatches may correspond with a type of product attribute. For instance, in secondary user interface 804, a first set of swatches 806 is associated with the first product attribute (i.e., size) and a second set of swatches 808 is associated with a second product attribute (i.e., color). In at least one example, as described above with reference to FIG. 3, based at least in part on a user 110 interacting with a swatch in the first set of swatches 806, a presentation of individual swatches in the second set of swatches 808 may be modified.

As shown, the product associated with the representative offer that is presented via the primary user interface 800 may be associated with a storage capacity of 32 GB and Color A. Swatch 810 represents a representative offer corresponding to a USB device having a storage capacity of 32 GB. Swatch 812 represents a representative offer corresponding to a USB device having a color of Color A. In at least one example, the representative offers associated with swatch 810 and swatch 812 may be a same representative offer, which, in some examples, may correspond to the offer presented via the primary user interface. The thick black lines surrounding swatch 810 and swatch 812 visually indicate that such product attributes are currently selected. Various visual indicators may be used to indicate which swatches are selected.

In at least one example, a user 110 may interact with a swatch 814, which is associated with a storage capacity of 64 GB, in the first set of swatches 806, as shown in FIG. 8A. As shown in FIG. 8B, a thick black line may surround the swatch 814 to visually indicate that the user 110 selected the swatch 814. Based at least in part on the user 110 selecting swatch 814, the presentation of individual swatches in the second set of swatches 808 may be updated to reflect whether a product associated with the 64 GB storage capacity is also available in each of the various colors. As described above with reference to FIG. 3, in some examples, a product associated with a first product attribute may not be available in a version associated with a second product attribute too. Accordingly, the swatch associated with the variation of the second attribute that is not available may be modified to visually indicate that the product is not available in the corresponding variation of the second attribute. As shown in FIG. 8B, a USB device in Color A and having 64 GB of storage capacity may not be available. Accordingly, the corresponding swatch 816 is shown with a dashed line boundary instead of a solid line boundary. Additional and/or alternative visual cues may be used to indicate that a product associated with a swatch is not available.

In at least one example, the next swatch associated with a product that is available may be selected. For instance, a USB device in Color B and having 64 GB of storage capacity is available. Accordingly, the swatch 818 corresponding to a representative offer for a USB device in Color B and having 64 GB of storage capacity may be shown as selected. However, based on selecting a USB device in Color B, the secondary user interface 804 may be updated to show that there is not a USB device in Color B available with 128 GB of storage capacity. That is, the corresponding swatch 820 is shown with a dashed line boundary instead of a solid line boundary. A user 110 may browse through other swatches to determine which of the various second product attributes he or she desires to select.

While FIGS. 8A and 8B are described such that a user 110 interacts with the first set of swatches 806 prior to the second set of swatches 808, a user 110 may interact with the second set of swatches 808 prior to the first set of swatches 806. In such examples, a presentation of individual swatches in the first set of swatches 806 may be modified to reflect the availability of products associated with the selected second product attribute and each of the various first product attributes. Furthermore, while secondary user interface 804 depicts two sets of swatches (e.g., 806 and 808) which respectively correspond with variations of two product attributes, in additional and/or alternative examples, a secondary user interface may include more or fewer sets of swatches which respectively correspond with variations of product attributes.

FIGS. 6A-D, 7, 8A, and 8B are non-limiting examples of user interfaces and it should be noted that various configurations and/or presentations may be used to provide a consolidated representation for same or similar products that are available for acquisition with variations of one or more product attributes.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
   receiving, from a service provider, data associated with offers for a plurality of products that are available for acquisition via an online marketplace provided by the service provider, the plurality of products being a same type of product;
   aggregating product attributes associated with the offers to generate aggregated product attributes;
   determining a representative offer of the offers, the representative offer corresponding to a first product of the plurality of products, the first product having a first product attribute of the aggregated product attributes;
   determining, based at least in part on the aggregated product attributes, that second products of the plurality of products are available with alternate product attributes of the aggregated product attributes;
   generating a primary user interface to present the representative offer, the primary user interface presenting a first graphical representation of the first product having the first product attribute and a first control indicating that the second products are available with alternate product attributes;
   presenting the primary user interface via a display of a device of a user;
   determining an actuation of the first control;
   generating a secondary user interface for presenting a number of offers corresponding to the second products, individual second products of the second products having different alternate product attributes;
   presenting the secondary user interface via the display of the device, the secondary user interface overlaying at least a portion of the primary user interface and including a second control for closing the secondary user interface;
   based at least in part on presenting the secondary user interface via the display of the device, causing an effect to be applied to the primary user interface to deemphasize the primary user interface and indicate that the primary user interface is not active;
   determining a selection of an offer of the number of offers corresponding to a second product of the second products, the second product having an alternate product attribute of the alternate product attributes;
   updating the primary user interface by replacing the first graphical representation with a second graphical representation of the second product;
   determining an actuation of the second control;
   terminating the presentation of the secondary user interface via the display of the device; and
   restoring the primary user interface to an original presentation, the primary user interface presenting the second graphical representation instead of the first graphical representation via the original presentation.

2. A computer-implemented method as claim 1 recites, wherein the secondary user interface includes swatches respectively corresponding to each offer of the number of offers, a swatch of the swatches associated with the offer including:
  the second graphical representation of the second product; and
  additional information associated with the offer, the additional information including at least one of a price associated with the offer, shipping options associated with the offer, payment terms associated with the offer, delivery options associated with the offer, or alternate product attributes associated with the second product.

3. A computer-implemented method as claim 2 recites, further comprising:
  accessing, from a user profile associated with the user, data representative of previous interactions between the user and the service provider;
  determining, based at least in part on the data representative of the previous interactions between the user and the service provider, preferences of the user concerning information presented in swatches; and
  determining the additional information associated with the offer based at least in part on the preferences of the user.

4. A computer-implemented method as claim 1 recites, further comprising:
  determining a size of the display of the device; and
  determining the number of offers based at least in part on the size of the display.

5. A computer-implemented method comprising:
  generating a primary user interface for presenting a product available for acquisition from a seller, the product having a product attribute and the primary user interface presenting the product and including an indication that one or more alternate products are available with alternate product attributes;
  presenting the primary user interface via a display of a device associated with a user;
  determining a request to access information about the one or more alternate products;
  generating a secondary user interface for presenting the information about the one or more alternate products;
  causing the secondary user interface to be presented via the display of the device, the secondary user interface overlaying a portion of the primary user interface;
  applying an effect to the primary user interface to deemphasize the primary user interface and indicate that the primary user interface is inactive;
  updating the primary user interface during display of the secondary user interface based at least in part on user interactions with the secondary user interface;
  terminating presentation of the secondary user interface via the display of the device; and
  restoring the primary user interface to an original presentation that includes a graphical representation based at least in part on the user interactions with the secondary user interface.

6. A computer-implemented method as claim 5 recites, further comprising causing the secondary user interface to overlay a bottom portion of the primary user interface.

7. A computer-implemented method as claim 5 recites, wherein:
  the primary user interface further includes a graphical representation of the product; and
  the method further comprises causing the secondary user interface to be positioned without obstructing the graphical representation.

8. A computer-implemented method as claim 5 recites, wherein the effect comprises at least one of an application of a layer having a degree of opaqueness to deemphasize the primary user interface, a reduction of a size of representations presented via the primary user interface, or a reduction of a brightness of the primary user interface.

9. A computer-implemented method as claim 5 recites, wherein:
  the primary user interface further includes a graphical representation of the product; and
  the method further comprises causing, based at least in part on receiving the indication, the graphical representation of the product to be replaced by another graphical representation of the alternate product having the alternate product attribute.

10. A computer-implemented method as claim 5 recites, wherein generating the secondary user interface comprises:
  accessing a representative item for the alternate product;
  generating a swatch based at least in part on the representative item; and
  generating the secondary user interface based at least in part on arranging the swatch with additional swatches respectively associated with other alternate products of the one or more alternate products.

11. A computer-implemented method as claim 10 recites, wherein the representative item comprises a text representation or a graphical representation.

12. A computer-implemented method as claim 10 recites, further comprising determining dimensions of the swatch based at least in part on the representative item.

13. A computer-implemented method as claim 10 recites, further comprising:
  accessing additional information associated with the alternate product;
  determining at least a portion of the additional information to present with the swatch; and
  generating the swatch based at least in part on at least the portion of the additional information.

14. A computer-implemented method as claim 13 recites, further comprising determining a configuration of the swatch based at least in part on at least the portion of the additional information.

15. A computer-implemented method as claim 10 recites, further comprising arranging at least a portion of the swatch and the additional swatches in a linear arrangement in the secondary user interface to enable browsing through the swatch and the additional swatches.

16. A system comprising:
  one or more processors; and
  a memory that stores instructions that are executable by the one or more processors to cause the system to perform operations comprising:
    generating a primary user interface for presenting an offer corresponding to a first product on a display of a device of a user, the primary user interface comprising:
      a first representative item associated with the first product, the first product having a first product attribute and a second product attribute; and
      an indication that second products are available with at least one of alternate first product attributes or alternate second product attributes;
    presenting the primary user interface on the display of the device;
    determining a request to access information associated with the second products;

generating a secondary user interface for presenting the information associated with the second products;

presenting the secondary user interface on the display of the device, the secondary user interface overlaying a bottom portion of the primary user interface;

updating the primary user interface during display of the secondary user interface based at least in part on user interactions with the secondary user interface;

terminating presentation of the secondary user interface on the display of the device; and restoring the primary user interface to an original presentation that includes a graphical representation based at least in part on the user interactions with the secondary user interface.

17. A system as claim 16 recites, wherein generating the secondary user interface comprises:

generating first swatches for each second product having an alternate first product attribute of the alternate first product attributes and the first product having the first product attribute, a first swatch of the first swatches representing a representative offer for a second product of the second products having an alternate first product attribute of the alternate first product attributes or the first product; and generating second swatches for each second product having an alternate second product attribute of the alternate second product attributes and the first product having the second product attribute, a second swatch of the second swatches representing a representative offer for a second product of the second products having an alternate second product attribute of the alternate second product attributes or the first product.

18. A system as claim 17 recites, wherein causing the secondary user interface to be presented on the display comprises:

presenting at least a first portion of the first swatches in a first configuration; and presenting at least a second portion of the second swatches in a second configuration.

19. A system as claim 16 recites, the operations further comprising:

determining a selection of a second product of the second products having an alternate first product attribute of the alternate first product attributes;

accessing offers for other second products having the alternate first product attribute;

aggregating product attributes associated with the offers to generate aggregated product attributes;

determining, based at least in part on the aggregated product attributes, that another second product of the second products having the second product attribute or an alternate second product attribute is available; and presenting a swatch on the secondary user interface indicating that the other second product having the second product attribute or the alternate second product attribute is available.

20. A system as claim 16 recites, the operations further comprising:

determining a selection of a second product of the second products having an alternate first product attribute of the alternate first product attributes;

accessing offers for other second products having the alternate first product attribute;

aggregating product attributes associated with the offers to generate aggregated product attributes;

determining, based at least in part on the aggregated product attributes, that another second product of the second products having the second product attribute or an alternate second product attribute is not available; and presenting a swatch on the secondary user interface indicating that the other second product having the second product attribute or the alternate second product attribute is not available.

\* \* \* \* \*